US012694097B2

(12) United States Patent
Shitrit et al.

(10) Patent No.: US 12,694,097 B2
(45) Date of Patent: Jul. 28, 2026

(54) SECURITY ACTION BASED ON ANOMALY DETECTION USING AI MODEL PROFILES AND USER PROFILES

(71) Applicant: Microsoft Technology Licensing, LLC, Redmond, WA (US)

(72) Inventors: Aviv Shitrit, Tirat Carmel (IL); Roee Oz, Tel Aviv (IL); Idan Hen, Tel Aviv (IL); Tamer Salman, Haifa (IL); Alon Danoch, Givatayim (IL); Ron Keller, Ramat Hasharon (IL); Asaf Harari, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/939,462

(22) Filed: Nov. 6, 2024

(65) Prior Publication Data

US 2026/0127268 A1 May 7, 2026

(51) Int. Cl.
*G06F 21/54* (2013.01)
*G06N 20/00* (2019.01)

(52) U.S. Cl.
CPC ............. *G06F 21/54* (2013.01); *G06N 20/00* (2019.01)

(58) Field of Classification Search
CPC ..... G06F 21/54; G06N 20/00; H04L 63/1425; H04L 63/1416; H04L 63/20; H04L 63/0876
See application file for complete search history.

(56) References Cited

U.S. PATENT DOCUMENTS

| | | | | |
|---|---|---|---|---|
| 11,178,170 B2 * | 11/2021 | Kuppa | ................... | G06N 3/088 |
| 2021/0360027 A1 * | 11/2021 | Boyer | .................... | H04L 51/212 |
| 2022/0247762 A1 * | 8/2022 | Jasleen | ................... | H04L 63/20 |
| 2023/0197225 A1 * | 6/2023 | Lemme | .................. | G06V 40/10 |
| | | | | 434/262 |
| 2024/0430277 A1 * | 12/2024 | Marbouti | ............... | G06N 3/045 |

(Continued)

FOREIGN PATENT DOCUMENTS

| | | | | |
|---|---|---|---|---|
| EP | 4645136 A1 * | 11/2025 | ........... | G06F 21/577 |

OTHER PUBLICATIONS

Sahil, S. Sood, S. Mehmi and S. Dogra, "Artificial intelligence for designing user profiling system for cloud computing security: Experiment," 2015 International Conference on Advances in Computer Engineering and Applications, Ghaziabad, India, 2015, pp. 51-58, (Year: 2015).*

(Continued)

*Primary Examiner* — Khalid M Almaghayreh
(74) *Attorney, Agent, or Firm* — Wade IP Law PLLC

(57) ABSTRACT
Techniques are described herein that are capable of performing a security action based on anomaly detection using artificial intelligence (AI) model profiles and user profiles. AI model profiles (e.g., a model-session profile, a model-prompt profile, and/or a model-response profile) associated with AI model(s) are generated. User profiles (e.g., user-session profiles, user-prompt profiles, and/or user-response profiles) associated with users of the AI model(s) are generated. A security action is performed with regard to an incoming AI prompt as a result of a difference between the incoming AI prompt and one or more of the AI model profiles and/or one or more of the user profiles being greater than or equal to a difference threshold.

21 Claims, 8 Drawing Sheets

(56)                    References Cited

U.S. PATENT DOCUMENTS

| | | | |
|---|---|---|---|
| 2025/0045656 A1* | 2/2025 | Khan | G06Q 10/063112 |
| 2025/0068741 A1* | 2/2025 | Lafon | G06F 16/3344 |
| 2025/0284785 A1* | 9/2025 | Nasim | G06F 21/53 |
| 2025/0285471 A1* | 9/2025 | Sivakumar | G06V 10/82 |
| 2025/0307420 A1* | 10/2025 | Hen | G06F 21/554 |
| 2025/0356725 A1* | 11/2025 | Nowak | G07F 17/3225 |
| 2025/0384380 A1* | 12/2025 | Inampudi | G06Q 10/0639 |
| 2025/0390316 A1* | 12/2025 | Singh | G06F 9/451 |
| 2026/0006053 A1* | 1/2026 | Ahmad | G06F 21/55 |
| 2026/0024037 A1* | 1/2026 | Mystetskyi | G06Q 10/06316 |
| 2026/0037318 A1* | 2/2026 | Yada | G06F 9/5038 |

OTHER PUBLICATIONS

International Search Report and Written Opinion received for PCT
Application No. PCT/US2025/039377, mailed on Oct. 30, 2025, 13
pages.

* cited by examiner

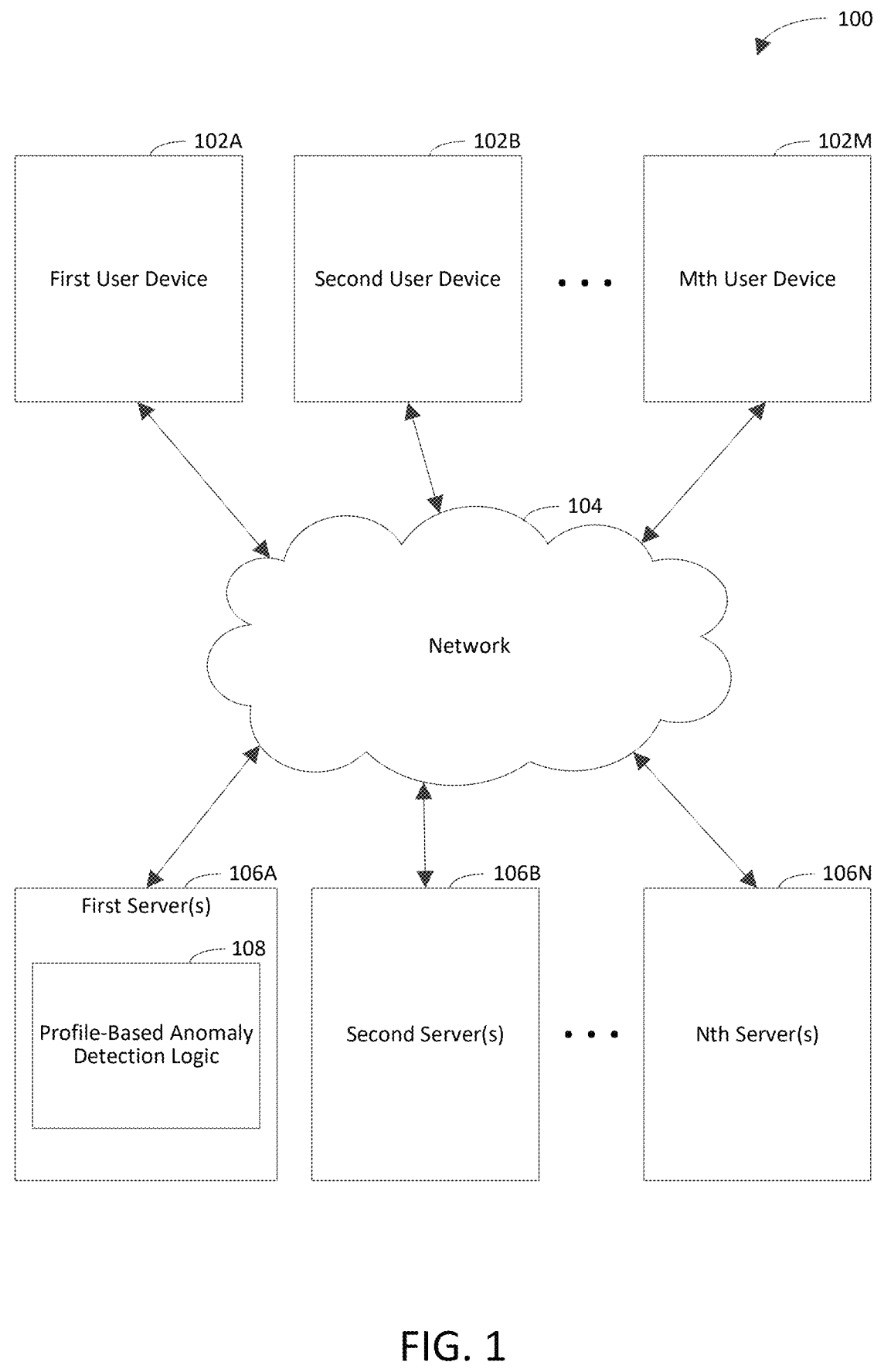

100

102A

First User Device

102B

Second User Device

. . .

102M

Mth User Device

104

Network

106A

First Server(s)

108

Profile-Based Anomaly Detection Logic

106B

Second Server(s)

. . .

106N

Nth Server(s)

FIG. 1

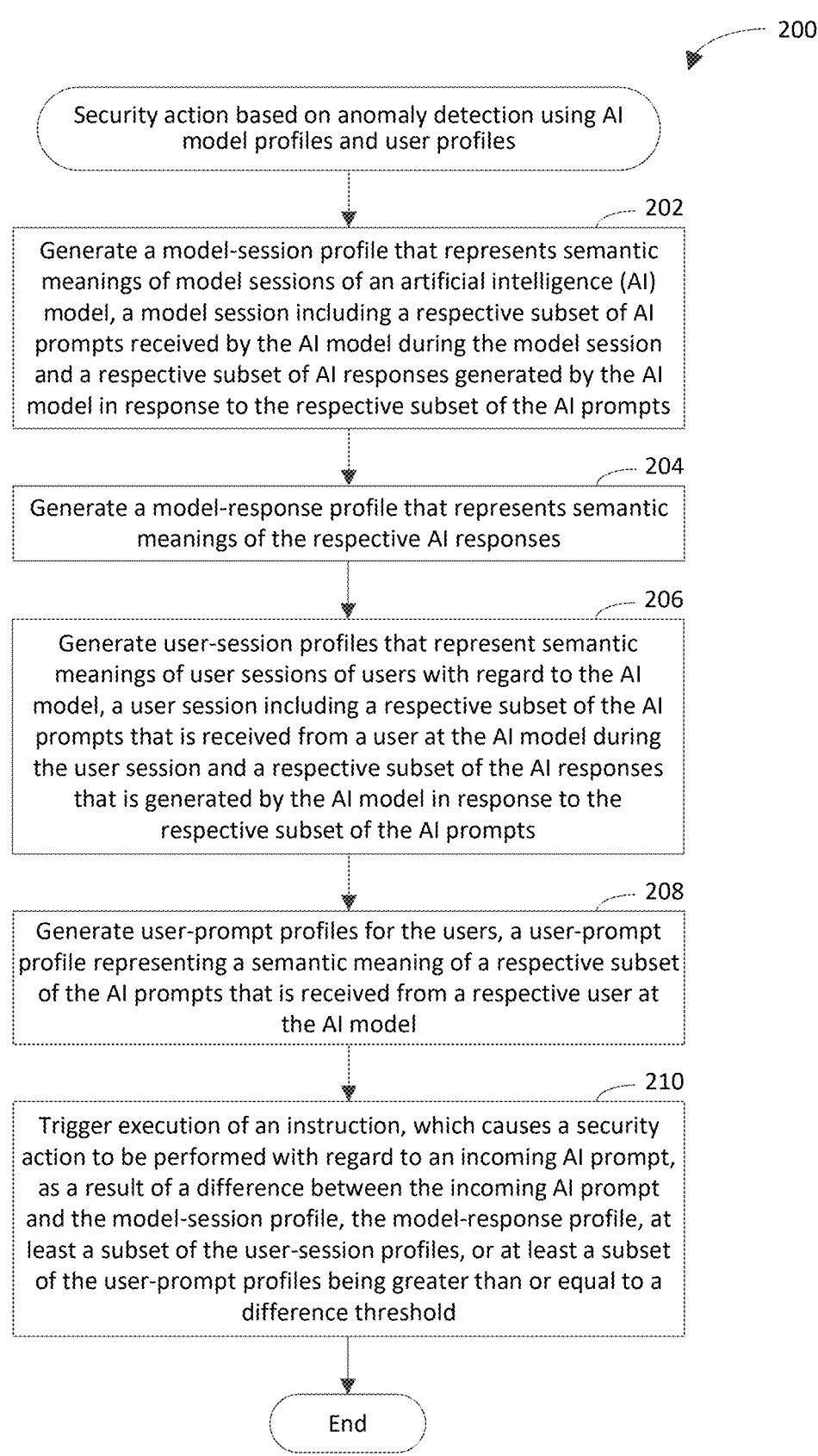

200

Security action based on anomaly detection using AI model profiles and user profiles

202

Generate a model-session profile that represents semantic meanings of model sessions of an artificial intelligence (AI) model, a model session including a respective subset of AI prompts received by the AI model during the model session and a respective subset of AI responses generated by the AI model in response to the respective subset of the AI prompts

204

Generate a model-response profile that represents semantic meanings of the respective AI responses

206

Generate user-session profiles that represent semantic meanings of user sessions of users with regard to the AI model, a user session including a respective subset of the AI prompts that is received from a user at the AI model during the user session and a respective subset of the AI responses that is generated by the AI model in response to the respective subset of the AI prompts

208

Generate user-prompt profiles for the users, a user-prompt profile representing a semantic meaning of a respective subset of the AI prompts that is received from a respective user at the AI model

210

Trigger execution of an instruction, which causes a security action to be performed with regard to an incoming AI prompt, as a result of a difference between the incoming AI prompt and the model-session profile, the model-response profile, at least a subset of the user-session profiles, or at least a subset of the user-prompt profiles being greater than or equal to a difference threshold End

FIG. 2

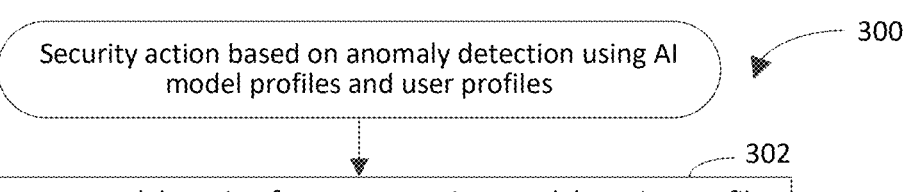

300

302

Generate a model-session feature vector in a model-session profile, which represents semantic meanings of model sessions of artificial intelligence (AI) models, by embedding at least a subset of the model sessions, a model session comprising a first subset of AI prompts that is received by an AI model during the model session and a first subset of AI responses that is generated by the AI model in response to the first subset of the AI prompts

304

Generate a model-response feature vector in a model-response profile, which represents semantic meanings of the AI responses that are generated by the AI models, by embedding at least a subset of the AI responses

306

Generate user-session feature vectors in user-session profiles, which represent semantic meanings of user sessions of users with regard to the AI models, by embedding the user sessions, which comprise respective second subsets of the AI prompts that are received among the AI models from the users during the user sessions and respective second subsets of the AI responses that are generated in response to the respective second subsets of the AI prompts

308

Generate user-prompt feature vectors in user-prompt profiles for the users by embedding respective third subsets of the AI prompts that are received among the AI models from the users

310

Trigger execution of an instruction, which causes a security action to be performed with regard to an incoming AI prompt, as a result of a difference between an embedding that represents the incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to a difference threshold End

FIG. 3

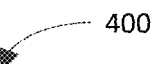

Security action based on anomaly detection using AI model profiles and user profiles

402

Generate a model-session profile that represents semantic meanings of model sessions of artificial intelligence (AI) models, a model session including a respective subset of AI prompts received by an AI model during the model session and a respective subset of AI responses generated by the AI model in response to the respective subset of the AI prompts

404

Generate a model-response profile that represents semantic meanings of a plurality of AI responses that are generated by the AI models in response to a plurality of respective AI prompts

406

Generate a model-prompt profile that represents semantic meanings of the plurality of AI prompts

408

Generate user-session profiles that represent semantic meanings of user sessions of users with regard to the AI models, a user session including a respective subset of the plurality of AI prompts that is received from a user at an AI model during the user session and a respective subset of the plurality of AI responses that is generated by the AI model in response to the respective subset of the AI prompts

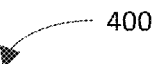

400

A

410

Generate user-prompt profiles for the users, a user-prompt profile representing semantic meanings of respective AI prompts in a respective subset of the plurality of AI prompts that is received among the AI models from a respective user

412

Generate user-response profiles for the users, a user-response profile representing semantic meanings of respective AI responses in a respective subset of the plurality of AI responses that is generated by at least a subset of the AI models in response to a respective subset of the plurality of AI prompts that is received from a respective user among at least the subset of the AI models

414

Trigger execution of an instruction, which causes a security action to be performed with regard to an incoming AI prompt, as a result of a difference between the incoming AI prompt and the model-session profile, the model-response profile, the model-prompt profile, at least a subset of the user-session profiles, at least a subset of the user-prompt profiles, or at least a subset of the user-response profiles being greater than or equal to a difference threshold

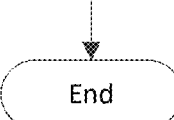

End

FIG. 4B

SECURITY ACTION BASED ON ANOMALY DETECTION USING AI MODEL PROFILES AND USER PROFILES

BACKGROUND

Artificial intelligence (AI) models may encounter security threats, such as cyberattacks and data breaches. For example, a malicious entity may attempt to infect an AI model with malware or gain unauthorized access to the AI model. In another example, a malicious entity may cause an AI model to generate undesirable (e.g., offensive) outputs by injecting undesirable information into data that the AI model uses to generate the outputs. Anomaly detection techniques may be used to detect security threats to AI models. An anomaly detection technique is configured to identify an unusual occurrence (e.g., an unusual pattern or behavior) with regard to a system. For instance, an anomaly detection technique that is used on an AI model may be configured to identify an atypical utilization of the AI model or an atypical output of the AI model. However, developing an anomaly detection technique for use on an AI model may be challenging. For example, the anomaly detection technique may require a comprehensive understanding of the AI model and behavior patterns of its users. A capability of the AI model to process various types of data and a relatively large quantity of data generated by the AI model may complicate development of the anomaly detection technique. Conventional anomaly detection techniques for AI models traditionally focus on detecting known malicious behavior in the AI models (e.g., jailbreak attempts) and have relatively low coverage. Accordingly, the conventional anomaly detection techniques may miss important signals and may require a rebuild of the AI models for each new security threat.

SUMMARY

Artificial intelligence (AI) is intelligence of a machine (e.g., a computing system) and/or code (e.g., software and/or firmware), as opposed to intelligence of a living creature (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

An AI prompt may not be written in a natural language. For instance, the AI prompt may include (e.g., be) computer code. The AI prompt may be any suitable sequence of characters that is capable of being interpreted by an AI model.

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an intelligent being (e.g., a human) is capable of performing. In an example implementation, the artificial general intelligence model is capable of performing a task that surpasses the capabilities of an animal.

A cyberattack is an attempt to cause harm to a system (e.g., an AI model). For instance, the harm may be an unauthorized or illegal access to the system. Examples of a cyberattack include but are not limited to a denial of service (DoS) attack, a distributed DoS (DDoS) attack, a man-in-the-middle (MITM) attack, a malware attack, a phishing attack, a ransomware attack, and a cross-site scripting (XSS) attack. A DoS attack is an attack that renders a system unable to respond to a legitimate service request by overwhelming resource(s) of the system. A DDoS attack is similar to a DoS attack but involves multiple (e.g., a vast array) malware-infected hosts that are controlled by a threat actor to cause resource exhaustion. A threat actor is an entity (e.g., a person, a group of people, or a system (e.g., an autonomous agent)) that intentionally causes (or tries to cause or is configured to cause) harm to a system. An MITM attack is an attack that enables a threat actor to eavesdrop on data exchanged between multiple entities (e.g., people, networks, or computers). A malware attack is an attack in which malicious software is introduced (e.g., injected) to a system to damage the system and/or to steal information from the system. A phishing attack is an attack in which a deceptive communication (e.g., an electronic mail (a.k.a. email) message) is provided to an entity to trick the entity into revealing sensitive information or into downloading malware. A ransomware attack is an attack that encrypts file(s) and/or system(s) and demands payment (a.k.a. a ransom) for decryption. An XSS attack exploits a vulnerability of a web application to introduce a malicious script into a web page that is viewed by other users.

An anomaly is an unusual (e.g., atypical or unexpected) occurrence with regard to a system (e.g., an AI model). For instance, the unusual occurrence may be an unusual pattern or an unusual behavior. In an aspect, the unusual occurrence is an unusual utilization (e.g., one or more unusual AI prompts) of an AI model or an unusual output (e.g., one or more unusual AI responses) of the AI model.

A security action is an action that is performed to increase security of a system (e.g., an AI model) and/or a user of the system. In an aspect, the security action is performed in response to detection of an anomaly with regard to the system. In accordance with this aspect, performance of the security action may be triggered by detection of the anomaly. Examples of a security action include but are not limited to isolating a machine, containing (e.g., quarantining) a user, containing an account, containing a file, containing a folder, stopping a virtual machine, blocking an AI model from generating an AI response in response to an AI prompt, replacing an AI response of the AI model with a replacement AI response, and rotating (e.g., changing) a secret (e.g., a password, an application programming interface (API) key, an encryption key, or other credential).

It may be desirable to use profiles of AI model(s) (a.k.a. "AI model profiles") and profiles of users of the AI model(s) (a.k.a. "user profiles") to perform anomaly detection with regard to the AI model(s). Using the AI model profiles and the user profiles may provide a more comprehensive understanding of the AI model(s) and behavior patterns of the users, as compared to conventional techniques for detecting an anomaly with regard to an AI model. Having a more comprehensive understanding of the AI model(s) and the behavior patterns of the users may enable previously unknown malicious behaviors in the AI model(s) to be detected. By enabling previously unknown malicious behaviors to be detected, coverage of an anomaly detection technique may be increased and/or new security threats may be detected without a need to rebuild the AI model(s). Coverage of an anomaly detection technique indicates a number of anomalies (e.g., anomaly types) that the anomaly detection technique is capable of detecting.

Various approaches are described herein for, among other things, performing a security action based on (e.g., based at least on) anomaly detection using AI model profiles and user profiles. In a first example approach, a model-session profile is generated. The model-session profile represents semantic meanings of respective model sessions of an AI model. A model session includes a respective subset of AI prompts that is received by the AI model during the model session and a respective subset of AI responses that is generated by the AI model in response to the respective subset of the AI prompts. A model-response profile is generated. The model-response profile represents semantic meanings of the respective AI responses. User-session profiles are generated. The user-session profiles represent semantic meanings of user sessions of users with regard to the AI model. A user session includes a respective subset of the AI prompts that is received from a user at the AI model during the user session and a respective subset of the AI responses that is generated by the AI model in response to the respective subset of the AI prompts. User-prompt profiles are generated for the respective users. A user-prompt profile represents a semantic meaning of a respective subset of the AI prompts that is received from a user at the AI model. Execution of an instruction is triggered as a result of a difference between an incoming AI prompt and the model-session profile, the model-response profile, at least a subset of the user-session profiles, or at least a subset of the user-prompt profiles being greater than or equal to a difference threshold. Triggering the execution of the instruction causes a security action to be performed with regard to the incoming AI prompt.

In a second example approach, a model-session feature vector is generated in a model-session profile, which represents semantic meanings of model sessions of artificial intelligence (AI) models, by embedding at least a subset of the model sessions. A model session includes a first subset of AI prompts that is received by an AI model during the model session and a first subset of AI responses that is generated by the AI model in response to the first subset of the AI prompts. A model-response feature vector is generated in a model-response profile, which represents semantic meanings of the AI responses that are generated by the AI models, by embedding at least a subset of the AI responses. User-session feature vectors are generated in user-session profiles, which represent semantic meanings of user sessions of users with regard to the AI models, by embedding the user sessions. The user sessions include respective second subsets of the AI prompts that are received among the AI models from the users during the user sessions and respective second subsets of the AI responses that are generated in response to the respective second subsets of the AI prompts. User-prompt feature vectors are generated in user-prompt profiles for the users by embedding respective third subsets of the AI prompts that are received among the AI models from the users. Execution of an instruction is triggered as a result of a difference between an embedding that represents an incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to a difference threshold. The execution of the instruction causes a security action to be performed with regard to the incoming AI prompt.

In a third example approach, a model-session profile is generated. The model-session profile represents semantic meanings of model sessions of AI models. A model session includes a respective subset of AI prompts received by an AI model during the model session and a respective subset of AI responses generated by the AI model in response to the respective subset of the AI prompts. A model-response profile is generated. The model-response profile represents semantic meanings of a plurality of AI responses that are generated by the AI models in response to a plurality of AI prompts. A model-prompt profile is generated. The model-prompt profile represents semantic meanings of the plurality of AI prompts. User-session profiles are generated. The user-session profiles represent semantic meanings of user sessions of users with regard to the AI models. A user session includes a respective subset of the plurality of AI prompts that is received from a user at an AI model during the user session and a respective subset of the plurality of AI responses that is generated by the AI model in response to the respective subset of the AI prompts. User-prompt profiles are generated for the users. A user-prompt profile represents semantic meanings of respective AI prompts in a subset of the plurality of AI prompts that is received among the AI models from a user. User-response profiles are generated for the users. A user-response profile represents semantic meanings of respective AI responses in a subset of the plurality of AI responses that is generated by an AI model in response to a subset of the plurality of AI prompts that is received from a user at the AI model. Execution of an instruction is triggered as a result of a difference between an incoming AI prompt and the model-session profile, the model-response profile, the model-prompt profile, at least a subset of the user-session profiles, at least a subset of the user-prompt profiles, or at least a subset of the user-response profiles being greater than or equal to a difference threshold. Triggering the execution of the instruction causes a security action to be performed with regard to the incoming AI prompt.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example profile-based anomaly detection system in accordance with an embodiment.

FIGS. 2-3 depict flowcharts of example methods for performing a security action based on anomaly detection using AI model profiles and user profiles in accordance with embodiments.

FIGS. 4A-4B depict respective portions of a flowchart of another example method for performing a security action based on anomaly detection using AI model profiles and user profiles in accordance with an embodiment.

Figure 5:
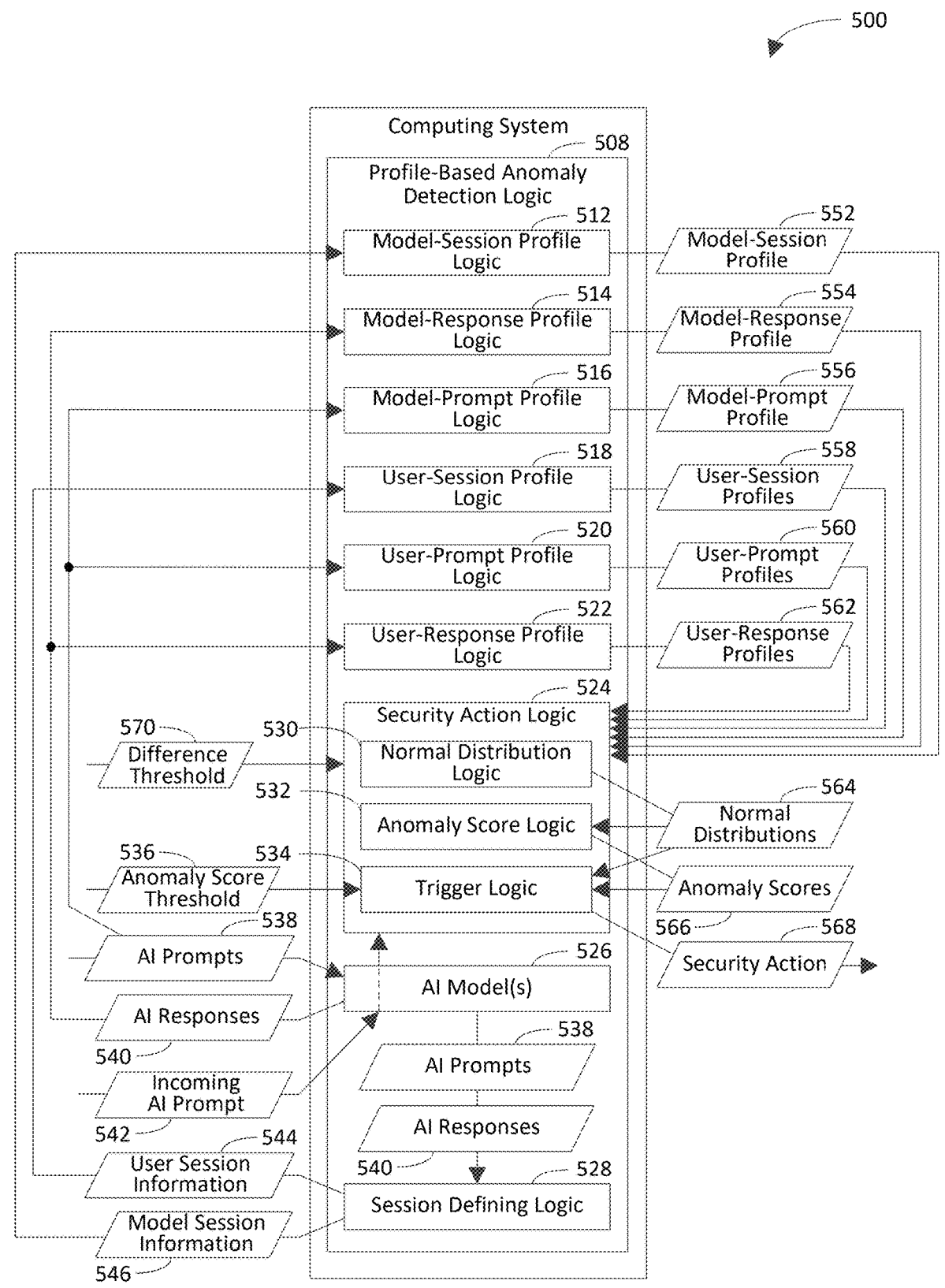
FIG. 5 is a block diagram of an example computing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

Artificial intelligence (AI) is intelligence of a machine (e.g., a computing system) and/or code (e.g., software and/or firmware), as opposed to intelligence of a living creature (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

An AI prompt may not be written in a natural language. For instance, the AI prompt may include (e.g., be) computer code. The AI prompt may be any suitable sequence of characters that is capable of being interpreted by an AI model.

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an intelligent being (e.g., a human) is capable of performing. In an example implementation, the artificial general intelligence model is capable of performing a task that surpasses the capabilities of an animal.

A cyberattack is an attempt to cause harm to a system (e.g., an AI model). For instance, the harm may be an unauthorized or illegal access to the system. Examples of a cyberattack include but are not limited to a denial of service (DoS) attack, a distributed DoS (DDoS) attack, a man-in-the-middle (MITM) attack, a malware attack, a phishing attack, a ransomware attack, and a cross-site scripting (XSS) attack. A DoS attack is an attack that renders a system unable to respond to a legitimate service request by overwhelming resource(s) of the system. A DDoS attack is similar to a DoS attack but involves multiple (e.g., a vast array) malware-infected hosts that are controlled by a threat actor to cause resource exhaustion. A threat actor is an entity (e.g., a person, a group of people, or a system (e.g., an autonomous agent)) that intentionally causes (or tries to cause or is configured to cause) harm to a system. An MITM attack is an attack that enables a threat actor to eavesdrop on data exchanged between multiple entities (e.g., people, networks, or computers). A malware attack is an attack in which malicious software is introduced (e.g., injected) to a system to damage the system and/or to steal information from the system. A phishing attack is an attack in which a deceptive communication (e.g., an electronic mail (a.k.a. email) message) is provided to an entity to trick the entity into revealing sensitive information or into downloading malware. A ransomware attack is an attack that encrypts file(s) and/or system(s) and demands payment (a.k.a. a ransom) for decryption. An XSS attack exploits a vulnerability of a web application to introduce a malicious script into a web page that is viewed by other users.

An anomaly is an unusual (e.g., atypical or unexpected) occurrence with regard to a system (e.g., an AI model). For instance, the unusual occurrence may be an unusual pattern or an unusual behavior. In an aspect, the unusual occurrence is an unusual utilization (e.g., one or more unusual AI prompts) of an AI model or an unusual output (e.g., one or more unusual AI responses) of the AI model.

A security action is an action that is performed to increase security of a system (e.g., an AI model) and/or a user of the system. In an aspect, the security action is performed in response to detection of an anomaly with regard to the system. In accordance with this aspect, performance of the security action may be triggered by detection of the anomaly. Examples of a security action include but are not limited to isolating a machine, containing (e.g., quarantining) a user, containing an account, containing a file, containing a folder, stopping a virtual machine, blocking an AI model from generating an AI response in response to an AI prompt, replacing an AI response of the, AI model with a replacement AI response, and rotating (e.g., changing) a secret (e.g., a password, an application programming interface (API) key, an encryption key, or other credential).

It may be desirable to use profiles of AI model(s) (a.k.a. "AI model profiles") and profiles of users of the AI model(s) (a.k.a. "user profiles") to perform anomaly detection with regard to the AI model(s). Using the AI model profiles and the user profiles may provide a more comprehensive understanding of the AI model(s) and behavior patterns of the users, as compared to conventional techniques for detecting an anomaly with regard to an AI model. Having a more comprehensive understanding of the AI model(s) and the behavior patterns of the users may enable previously unknown malicious behaviors in the AI model(s) to be detected. By enabling previously unknown malicious behaviors to be detected, coverage of an anomaly detection technique may be increased and/or new security threats may be detected without a need to rebuild the AI model(s). Coverage of an anomaly detection technique indicates a number of anomalies (e.g., anomaly types) that the anomaly detection technique is capable of detecting.

Example embodiments described herein are capable of performing a security action based on (e.g., based at least on) anomaly detection using AI model profiles and user profiles. In a first example approach, a model-session profile is generated. The model-session profile represents semantic meanings of respective model sessions of an AI model. A model session includes a respective subset of AI prompts that is received by the AI model during the model session and a respective subset of AI responses that is generated by the AI model in response to the respective subset of the AI prompts. A model-response profile is generated. The model-response profile represents semantic meanings of the respective AI responses. User-session profiles are generated. The user-session profiles represent semantic meanings of user sessions of users with regard to the AI model. A user session includes a respective subset of the AI prompts that is received from a user at the AI model during the user session and a respective subset of the AI responses that is generated by the AI model in response to the respective subset of the AI prompts. User-prompt profiles are generated for the respective users. A user-prompt profile represents a semantic meaning of a respective subset of the AI prompts that is received from a user at the AI model. Execution of an instruction is triggered as a result of a difference between an incoming AI prompt and the model-session profile, the model-response profile, at least a subset of the user-session profiles, or at least a subset of the user-prompt profiles being greater than or equal to a difference threshold. Triggering the execution of the instruction causes a security action to be performed with regard to the incoming AI prompt.

In a second example approach, a model-session feature vector is generated in a model-session profile, which represents semantic meanings of model sessions of artificial intelligence (AI) models, by embedding at least a subset of the model sessions. A model session includes a first subset of AI prompts that is received by an AI model during the model session and a first subset of AI responses that is generated by the AI model in response to the first subset of the AI prompts. A model-response feature vector is generated in a model-response profile, which represents semantic meanings of the AI responses that are generated by the AI models, by embedding at least a subset of the AI responses. User-session feature vectors are generated in user-session profiles, which represent semantic meanings of user sessions of users with regard to the AI models, by embedding the user sessions. The user sessions include respective second subsets of the AI prompts that are received among the AI models from the users during the user sessions and respective second subsets of the AI responses that are generated in response to the respective second subsets of the AI prompts. User-prompt feature vectors are generated in user-prompt profiles for the users by embedding respective third subsets of the AI prompts that are received among the AI models from the users. Execution of an instruction is triggered as a result of a difference between an embedding that represents an incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to a difference threshold. The execution of the instruction causes a security action to be performed with regard to the incoming AI prompt.

In a third example approach, a model-session profile is generated. The model-session profile represents semantic meanings of model sessions of AI models. A model session includes a respective subset of AI prompts received by an AI model during the model session and a respective subset of AI responses generated by the AI model in response to the respective subset of the AI prompts. A model-response profile is generated. The model-response profile represents semantic meanings of a plurality of AI responses that are generated by the AI models in response to a plurality of AI prompts. A model-prompt profile is generated. The model-prompt profile represents semantic meanings of the plurality of AI prompts. User-session profiles are generated. The user-session profiles represent semantic meanings of user sessions of users with regard to the AI models. A user session includes a respective subset of the plurality of AI prompts that is received from a user at an AI model during the user session and a respective subset of the plurality of AI responses that is generated by the AI model in response to the respective subset of the AI prompts. User-prompt profiles are generated for the users. A user-prompt profile represents semantic meanings of respective AI prompts in a subset of the plurality of AI prompts that is received among the AI models from a user. User-response profiles are generated for the users. A user-response profile represents semantic meanings of respective AI responses in a subset of the plurality of AI responses that is generated by an AI model in response to a subset of the plurality of AI prompts that is received from a user at the AI model. Execution of an instruction is triggered as a result of a difference between an incoming AI prompt and the model-session profile, the model-response profile, the model-prompt profile, at least a subset of the user-session profiles, at least a subset of the user-prompt profiles, or at least a subset of the user-response profiles being greater than or equal to a difference threshold. Triggering the execution of the instruction causes a security action to be performed with regard to the incoming AI prompt.

Example techniques described herein have a variety of benefits as compared to conventional techniques for detecting an anomaly with regard to an AI model. For instance, the example techniques are capable of increasing security and privacy of the AI model and its users to a greater extent than the conventional techniques. For instance, the example techniques are capable of identifying an anomaly with regard to the AI model more accurately, precisely, and/or reliably than the conventional techniques (e.g., by determining whether a difference between an incoming AI prompt and AI model profile(s) and/or user profile(s) is greater than or equal to a difference threshold), which increases the security and the privacy of the AI model and the users. By identifying an anomaly with regard to the AI model, the example techniques are capable of performing a security operation that addresses a potential security risk associated with the anomaly (e.g., based on the difference between the incoming AI prompt and the AI model profile(s) and/or the user profile(s) being greater than or equal to the difference threshold). Accordingly, the example techniques may be more proactive in addressing such security risks. The example techniques are capable of increasing quality (e.g., accuracy and/or precision) and/or reliability of outputs (i.e., AI responses) generated by the AI model. For instance, upon identifying an anomaly with regard to the AI model, the example techniques may block an AI response associated with the anomaly from being provided by the AI model and/or cause the AI model to generate an alternative AI response to replace the AI response.

The example techniques are capable of providing a more comprehensive understanding of the AI model and behavior patterns of its users, as compared to the conventional techniques (e.g., by utilizing the AI model profile(s) and/or the user profile(s)). The example techniques are capable of handling (e.g., processing) a variety of types of data (e.g., text, media, and code), for example, in AI prompts and AI responses of the AI model. The example techniques are capable of handling a substantial volume of data (e.g., AI prompts and AI responses) associated with the AI model. The example techniques are capable of identifying instances of previously unknown malicious behaviors. Accordingly, the example techniques are capable of covering more anomalies (e.g., more types of anomalies) than the conventional techniques. The AI model need not be rebuilt for each new security threat. The example techniques may provide fewer false positives and/or fewer false negatives than the conventional techniques. A false positive is an incorrect determination that a non-anomalous activity is anomalous. For instance, the false positive may indicate that a non-malicious activity is malicious. A false negative is an incorrect determination that an anomalous activity is not anomalous. For example, the false negative may indicate that a malicious activity is not malicious. Reducing the number of false positives and/or false negatives may increase the security of the AI model.

The example techniques may reduce an amount of time and/or resources (e.g., processor cycles, memory, network bandwidth) that is consumed to determine whether one or more AI prompts received by the AI model and/or one or more AI responses generated by the AI model are anomalous. For instance, by providing a more comprehensive understanding of the AI model and behavior patterns of its users, the example techniques may reduce the amount of time and/or resources that otherwise would have been consumed to obtain such an understanding. By being capable of identifying instances of previously unknown malicious behaviors and not requiring the AI model to be rebuilt in order for such previously unknown malicious behaviors to be identified, the example techniques may reduce the amount of time and/or resources that otherwise would have been consumed to identify the previously unknown malicious behaviors. The example techniques may automate detection of anomalies with regard to the AI model and/or performance of security actions to address (e.g., remediate) the anomalies. By reducing the amount of time and/or resources that is consumed by a computing system to determine whether one or more AI prompts received by the AI model and/or one or more AI responses generated by the AI model are anomalous, the efficiency of the computing system may be increased.

By reducing the amount of time that is consumed to determine whether one or more AI prompts received by the AI model and/or one or more AI responses generated by the AI model are anomalous, the example techniques may increase a user experience and/or efficiency of a security professional who manages security of the AI model and/or an end user who uses the AI model. The example techniques may reduce a number of tasks that are manually performed by the security professional and/or the end user by automating detection of anomalies with regard to the AI model and/or performance of security actions to address (e.g., remediate) the anomalies. Reducing the number of tasks that are manually performed by the security professional may enable the security professional to focus on other tasks, which may increase the security of the AI model. The user experience and/or efficiency of the security professional and/or the end user may be increased in other ways, as well. For example, the user experience and/or the efficiency may be increased by increasing the security of the AI model. In another example, the user experience and/or the efficiency may be increased through a more accurate, precise, and/or reliable determination as to whether AI prompt(s) received by the AI model and/or AI respons(es) generated by the AI model are anomalous (e.g., as a result of indicating an anomalous pattern or anomalous behavior).

FIG. 1 is a block diagram of an example profile-based anomaly detection system 100 in accordance with an embodiment. Generally speaking, the profile-based anomaly detection system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the profile-based anomaly detection system 100 performs a security action based on (e.g., based at least on) anomaly detection using AI model profiles and user profiles. Detail regarding techniques for performing a security action based on anomaly detection using AI model profiles and user profiles is provided in the following discussion.

As shown in FIG. 1, the profile-based anomaly detection system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers

106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the profile-based anomaly detection system 100.

One example type of computer program that may be executed by one or more of the servers 106A-106N is a computer security program. A computer security program is a computer program that provides security with regard to information and/or communications associated with a computing system. For instance, the information associated with the computing system may include information stored on the computing system and/or information accessed (e.g., read) by the computing system. The communications associated with the computing system may include communications received by the computing system and/or communications provided (e.g., transmitted) by the computing system. An example of a communication is an electronic message. In an aspect, the computing system hosts an AI model. In accordance with this aspect, the communications received by the computing system include AI prompts received by the AI model, and the communications provided by the computing system include AI responses generated by the AI model in response to the AI prompts. Examples of a computer security program include Bitdefender® security program, developed and distributed by Bitdefender IPR Management Ltd.; Norton® security program, developed and distributed by Gen Digital Inc.; Avast® security program, developed and distributed by Avast Software S.R.O.; McAfee® security program, developed and distributed by McAfee, LLC; and Microsoft Defender® security program, developed and distributed by Microsoft Corporation. It will be recognized that the example techniques described herein may be implemented using a computer security program. For instance, a software product (e.g., a subscription service, a non-subscription service, or a combination thereof) may include the computer security program, and the software product may be configured to perform the example techniques, though the scope of the example embodiments is not limited in this respect.

The computer security program may be a cloud native application protection platform (CNAPP). A CNAPP is an all-in-one platform that unifies security and compliance capabilities to prevent, detect, and respond to cloud security threats. A CNAPP integrates multiple cloud security solutions, which traditionally have been siloed, into a common (e.g., single) user interface. The cloud security solutions may include cloud security posture management (CSPM), multipipeline development and operations (DevOps) security, a cloud workload protection platform (CWPP), cloud infrastructure entitlement management (CIEM), and cloud service network security (CSNS). CSPM provides a connected, prioritized view of potential vulnerabilities and misconfigurations across multi-cloud and hybrid environments. The CSPM continuously assesses overall security posture of a system and provides automated alerts and recommendations about critical issues that could expose the system to data breaches. The CSPM may include automated compliance management and remediation tools to identify and remedy compliance deficiencies. Multipipeline DevOps security provides a central console that enables management of DevOps security across multiple (e.g., all) pipelines. For instance, the multipipeline DevOps security may be used to reduce cloud misconfigurations and to scan new code to keep vulnerabilities therein from reaching a production environment. The multipipeline DevOps security may include infrastructure-as-code scanning tools that analyze configuration files from the earliest stages of development to confirm that new configuration files are compliant with security policies. A CWPP provides real-time detection and response to threats based on up-to-date information regarding multi-cloud workloads (e.g., virtual machines, containers, Kubernetes® pods and/or clusters, databases, storage accounts, network layers, and app services). The CWPP may enable a quick investigation into threats and reduce the attack surface of a system. CIEM centralizes permissions management across a cloud and hybrid footprint, which inhibits (e.g., prevents) accidental or malicious misuse of permissions. CSNS complements the CWPP by protecting cloud infrastructure in real time. The CSNS may include any of a variety of security tools, including but not limited to distributed denial-of-service protection, web application firewalls, transport layer security examination, and load balancing.

A computer security program may be incorporated into a cloud computing program (a.k.a. a cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to a Google Cloud® program developed and distributed by Google Inc.; an Oracle Cloud® program developed and distributed by Oracle Corporation; an Amazon Web Services® program developed and distributed by Amazon.com, Inc.; a Salesforce® program developed and distributed by Salesforce.com, Inc.; an AppSource® program developed and distributed by Microsoft Corporation; an Azure® program developed and distributed by Microsoft Corporation; a GoDaddy® program developed and distributed by GoDaddy.com LLC; and a Rackspace® program developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include profile-based anomaly detection logic 108 for illustrative purposes. The profile-based anomaly detection logic 108 is configured to perform a security action based on anomaly detection using AI model profiles and user profiles. In a first example implementation, the profile-based anomaly detection logic 108 generates a model-session profile. The model-session profile represents semantic meanings of respective model sessions of an AI model. A model session includes a respective subset of AI prompts that is received by the AI model during the model session and a respective subset of AI responses that is generated by the AI model in response to the respective subset of the AI prompts. The profile-based anomaly detection logic 108 generates a model-response profile. The model-response profile represents semantic meanings of the respective AI responses. The profile-based anomaly detection logic 108 generates user-session profiles. The user-session profiles represent semantic meanings of user sessions of users with regard to the AI model. A user session includes a respective subset of the AI prompts that is received from a user at the AI model during the user session and a respective subset of the AI responses that is generated by the AI model in response to the respective subset of the AI prompts. The profile-based anomaly detection logic 108 generates user-prompt profiles for the respective users. A user-prompt profile represents a semantic meaning of a respective subset of the AI prompts that is received from a user at the AI model. The profile-based anomaly detection logic 108 triggers execution of an instruction as a result of a difference between an incoming AI prompt and the model-session profile, the model-response profile, at least a subset of the user-session profiles, or at least a subset of the user-prompt profiles being greater than or equal to a difference threshold. By triggering the execution of the instruction, the profile-based anomaly detection logic 108 causes a security action to be performed with regard to the incoming AI prompt.

In a second example implementation, the profile-based anomaly detection logic 108 generates a model-session feature vector in a model-session profile, which represents semantic meanings of model sessions of artificial intelligence (AI) models, by embedding at least a subset of the model sessions. A model session includes a first subset of AI prompts that is received by an AI model during the model session and a first subset of AI responses that is generated by the AI model in response to the first subset of the AI prompts. The profile-based anomaly detection logic 108 generates a model-response feature vector in a model-response profile, which represents semantic meanings of the AI responses that are generated by the AI models, by embedding at least a subset of the AI responses. The profile-based anomaly detection logic 108 generates user-session feature vectors in user-session profiles, which represent semantic meanings of user sessions of users with regard to the AI models, by embedding the user sessions. The user sessions include respective second subsets of the AI prompts that are received among the AI models from the users during the user sessions and respective second subsets of the AI responses that are generated in response to the respective second subsets of the AI prompts. The profile-based anomaly detection logic 108 generates user-prompt feature vectors in user-prompt profiles for the users by embedding respective third subsets of the AI prompts that are received among the AI models from the users. The profile-based anomaly detection logic 108 triggers execution of an instruction as a result of a difference between an embedding that represents an incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to a difference threshold. By triggering the execution of the instruction, the profile-based anomaly detection logic 108 causes a security action to be performed with regard to the incoming AI prompt, In a third example implementation, the profile-based anomaly detection logic 108 generates a model-session profile. The model-session profile represents semantic meanings of model sessions of AI models. A model session includes a respective subset of AI prompts received by an AI model during the model session and a respective subset of AI responses generated by the AI model in response to the respective subset of the AI prompts. The profile-based anomaly detection logic 108 generates a model-response profile. The model-response profile represents semantic meanings of a plurality of AI responses that are generated by the AI models in response to a plurality of AI prompts. The profile-based anomaly detection logic 108 generates a model-prompt profile. The model-prompt profile represents semantic meanings of the plurality of AI prompts. The profile-based anomaly detection logic 108 generates user-session profiles. The user-session profiles represent semantic meanings of user sessions of users with regard to the AI models. A user session includes a respective subset of the plurality of AI prompts that is received from a user at an AI model during the user session and a respective subset of the plurality of AI responses that is generated by the AI model in response to the respective subset of the AI prompts. The profile-based anomaly detection logic 108 generates user-prompt profiles for the users. A user-prompt profile represents semantic meanings of respective AI prompts in a subset of the plurality of AI prompts that is received among the AI models from a user. The profile-based anomaly detection logic 108 generates user-response profiles for the users. A user-response profile represents semantic meanings of respective AI responses in a subset of the plurality of AI responses that is generated by an AI model in response to a subset of the plurality of AI prompts that is received from a user at the AI model. The profile-based anomaly detection logic 108 triggers execution of an instruction as a result of a difference between an incoming AI prompt and the model-session profile, the model-response profile, the model-prompt profile, at least a subset of the user-session profiles, at least a subset of the user-prompt profiles, or at least a subset of the user-response profiles being greater than or equal to a difference threshold. By triggering the execution of the instruction, the profile-based anomaly detection logic 108 causes a security action to be performed with regard to the incoming AI prompt.

The profile-based anomaly detection logic 108 may be implemented in various ways to perform a security action based on anomaly detection using AI model profiles and user profiles, including being implemented in hardware, software, firmware, or any combination thereof. For example, the profile-based anomaly detection logic 108 may be implemented as computer program code configured to be executed in one or more processors. In another example, at least a portion of the profile-based anomaly detection logic 108 may be implemented as hardware logic/electrical circuitry. For instance, at least a portion of the profile-based anomaly detection logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the profile-based anomaly detection logic 108 may be (or may be included in) a computer security program and/or a cloud computing program, though the scope of the example embodiments is not limited in this respect.

The profile-based anomaly detection logic 108 is shown to be incorporated in the first server(s) 106A for illustrative purposes and is not intended to be limiting. It will be recognized that the profile-based anomaly detection logic 108 (or any portion(s) thereof) may be incorporated in any one or more of the servers 106A-106N, any one or more of the user devices 102A-102M, or any combination thereof. For example, client-side aspects of the profile-based anomaly detection logic 108 may be incorporated in one or more of the user devices 102A-102M, and server-side aspects of profile-based anomaly detection logic 108 may be incorporated in one or more of the servers 106A-106N.

FIGS. 2-3 depict flowcharts 200 and 300 of example methods for performing a security action based on anomaly detection using AI model profiles and user profiles in accordance with embodiments. FIGS. 4A-4B depict respective portions of a flowchart 400 of another example method for performing a security action based on anomaly detection using AI model profiles and user profiles in accordance with an embodiment. Flowcharts 200, 300, and 400 may be performed by the first server(s) 106A shown in FIG. 1, for example. For illustrative purposes, flowcharts 200, 300, and 400 are described with respect to a computing system 500 shown in FIG. 5, which is an example implementation of the first server(s) 106A. As shown in FIG. 5, the computing system 500 includes profile-based anomaly detection logic 508. The profile-based anomaly detection logic 508 includes model-session profile logic 512, model-response profile logic 514, model-prompt profile logic 516, user-session profile logic 518, user-prompt profile logic 520, user-response profile logic 522, security action logic 524, AI model(s) 526, and session defining logic 528. The security action logic 524 includes normal distribution logic 530, anomaly score logic 532, and trigger logic 534. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, a model-session profile is generated. The model-session profile represents semantic meanings of model sessions of an AI model. A model session includes a respective subset of AI prompts received by the AI model during the model session and a respective subset of AI responses generated by the AI model in response to the respective subset of the AI prompts. A model session is a period of time that begins at a first time instance at which the AI model receives an AI prompt (referred to herein as a "session-starting AI prompt") and continues so long as each subsequent AI prompt (i.e., each AI prompt that temporally follows the session-starting AI prompt) that is received by the AI model includes context of previous AI prompt(s) in the model session, except that the model session may be configured to end based on an established amount of time passing since the first time instance being greater than or equal to a threshold amount of time. Each of the AI prompts and each of the AI responses may include any suitable type of information, including but not limited to text, media, and code. Examples of media include but are not limited to a still image, a video, and an audio file.

In an example implementation, the model-session profile logic 512 generates a model-session profile 552. The model-session profile 552 represents semantic meanings of model sessions of the AI model, which is included in the AI model(s) 526. In accordance with this implementation, a model session includes a respective subset of AI prompts 538 received by the AI model during the model session and a respective subset of AI responses 540 generated by the AI model in response to the respective subset of the AI prompts 538.

In an aspect of this implementation, the session defining logic 528 defines the model sessions by analyzing the AI prompts 538 and the AI responses 540. For instance, by analyzing the AI prompts 538 (e.g., attributes associated with the AI prompts 538) and the AI responses 540 (e.g., attributes associated with the AI responses 540), the session defining logic 528 may identify which of the AI responses 540 are generated in response to which of the AI prompts 538 and further determine which of the AI prompts 538 and which of the AI responses 540 are included in each model session. The session defining logic 528 may generate model session information 546 to indicate which of the AI prompts 538 and which of the AI responses 540 are included in each model session. In accordance with this aspect, model-session profile logic 512 generates the model-session profile 552 based on the model session information 546.

At step 204, a model-response profile is generated. The model-response profile represents semantic meanings of the respective AI responses. In an example implementation, the model-response profile logic 514 generates a model-response profile 554. The model-response profile 554 represents semantic meanings of the respective AI responses 540. Each of the model-session profile 552 and the model-response profile 554 may be based on (e.g., indicate) domain(s) accessed by the AI model to generate the AI responses

540, tasks performed by the AI model to generate the AI responses 540, tools used by the AI model to generate the AI responses 540, and so on.

At step 206, user-session profiles are generated. The user-session profiles represent semantic meanings of user sessions of users with regard to the AI model. A user session includes a respective subset of the AI prompts that is received from a user at the AI model during the user session and a respective subset of the AI responses that is generated by the AI model in response to the respective subset of the AI prompts. A user session of a user is a period of time that begins at a first time instance at which the user provides an AI prompt (referred to herein as a "session starting AI prompt") to an AI model and continues so long as each subsequent AI prompt (i.e., each AI prompt that temporally follows the session-starting AI prompt) that is provided by the user to the AI model includes context of previous AI prompt(s) in the user session, except that the user session may be configured to end based on an established amount of time passing since the first time instance being greater than or equal to a threshold amount of time. In an example implementation, the user-session profile logic 518 generates user-session profiles 558. The user-session profiles 558 represent semantic meanings of user sessions of users with regard to the AI model. A user session includes a respective subset of the AI prompts 538 that is received from a user at the AI model during the user session and a respective subset of the AI responses 540 that is generated by the AI model in response to the respective subset of the AI prompts 538.

In an aspect of this implementation, the session defining logic 528 defines the user sessions by analyzing the AI prompts 538 and the AI responses 540. For instance, by analyzing the AI prompts 538 (e.g., attributes associated with the AI prompts 538) and the AI responses 540 (e.g., attributes associated with the AI responses 540), the session defining logic 528 may identify which of the AI responses 540 are generated in response to which of the AI prompts 538 and further determine which of the AI prompts 538 and which of the AI responses 540 are included in each user session. The session defining logic 528 may generate user session information 544 to indicate which of the AI prompts 538 and which of the AI responses 540 are included in each user session. In accordance with this aspect, user-session profile logic 518 generates the user-session profiles 558 based on the user session information 544.

At step 208, user-prompt profiles are generated for the users. A user-prompt profile represents a semantic meaning of a respective subset of the AI prompts that is received from a respective user at the AI model. In an example implementation, the user-prompt profile logic 520 generates user-prompt profiles 560 for the users. Each of the user-prompt profiles 560 may represent a semantic meaning of a respective subset of the AI prompts 538 that is received from a respective user at the AI model. Each of the user-session profiles 558 and each of the user-prompt profiles 560 may be based on (e.g., indicate) attributes (e.g., interests, needs, a routine, or a language) of the corresponding user.

At step 210, execution of an instruction is triggered (e.g., automatically triggered) as a result of a difference between an incoming AI prompt and the model-session profile, the model-response profile, at least a subset of the user-session profiles, or at least a subset of the user-prompt profiles being greater than or equal to a difference threshold. In an aspect, the difference threshold is a statistically significant difference, an absolute difference, or a relative difference. One example of a relative difference is a percentage of difference. A percentage of difference between A and B may be calculated as (A−B)/A or (A−B)/B. Triggering the execution of the instruction causes a security action to be performed with regard to the incoming AI prompt. A security action is an action that is performed to increase security of a system (e.g., an AI model) and/or a user of the system. Accordingly, triggering the execution of the instruction, and thereby causing the security action to be performed, at step 210 may increase security of the AI model and/or a user from whom the incoming AI prompt is received. Examples of a security action include but are not limited to blocking a user from whom the incoming AI prompt is received from accessing the AI model or other resource(s); changing permission(s) (e.g., read write, execute, full control) of the user; blocking the AI model from generating an AI response in response to the incoming AI prompt; blocking the AI model from providing an AI response, which is generated by the AI model in response to the incoming AI prompt, to the user; replacing (e.g., causing the AI model to replace) an initial AI response, which is generated by the AI model in response to the incoming AI prompt, with a replacement AI response that is different from the initial AI response; providing a notice (e.g., an alert) to an entity (e.g., the user or a security professional) regarding the incoming AI prompt; turning off a virtual machine on which the AI model executes; blocking the virtual machine from accessing the Internet; and rotating, executing, deleting, or encrypting a secret. In an aspect, triggering the execution of the instruction at step 210 reduces an amount of time and/or resources (e.g., processor cycles, memory, network bandwidth) that is consumed by a computing system (e.g., computing system 500) to determine whether the incoming AI prompt is anomalous. By reducing the amount of time and/or resources that is consumed to determine whether the incoming AI prompt is anomalous, efficiency of the computing system may be increased.

In an example implementation, the security action logic 524 triggers execution of the instruction as a result of a difference between an incoming AI prompt 542 and the model-session profile 552, the model-response profile 554, at least a subset of the user-session profiles 558, or at least a subset of the user-prompt profiles 560 being greater than or equal to a difference threshold 570. A subset of the user-session profiles 558 includes fewer than all of the user-session profiles 558. However, "at least a subset of the user-session profiles 558" may include any one or more (e.g., all) of the user-session profiles 558. A subset of the user-prompt profiles 560 includes fewer than all of the user-prompt profiles 560. However, "at least a subset of the user-prompt profiles 560" may include any one or more (e.g., all) of the user-prompt profiles 560. By triggering the execution of the instruction, the security action logic 524 causes a security action 568 to be performed with regard to the incoming AI prompt 542. In an aspect, the security action 568 includes blocking the AI model from generating an AI response in response to the incoming AI prompt 542. In another aspect, the security action 568 includes causing the AI model to generate an alternative AI response to replace the AI response.

In an example embodiment, the difference between the incoming AI prompt and the model-session profile, the model-response profile, at least the subset of the user-session profiles, or at least the subset of the user-prompt profiles is determined using a K-nearest neighbors technique. A K-nearest neighbors technique is a technique that is used to determine the K closest points in a dataset based on a specified distance metric, where K is a positive integer.

In an example embodiment, each of the AI model(s) 526 is configured to analyze (e.g., develop and/or refine an understanding of) the AI prompts 538 (including tokens therein), relationships between any of the foregoing, and confidences in those relationships. For example, each of the AI model(s) 526 is configured to compare attributes of at least a subset of the AI prompts 538 (including the tokens therein), contextual information (which may include sample AI prompt(s)) using artificial intelligence to determine at least a respective subset of the AI responses 540. In an anomaly detection aspect, an anomaly detection AI model, which may include one or more of the AI model(s) 526 and/or a different AI model, is configured to compare attributes of at least a subset of the AI prompts 538 (including the tokens therein), at least a subset of the AI responses 540, corresponding session(s) (e.g., model sessions and/or user sessions), the incoming AI prompt 542 (including tokens therein), contextual information (which may include sample AI prompt(s), sample AI response(s), and sample session(s)) using artificial intelligence to determine whether the incoming AI prompt 542 is anomalous. For instance, the model-session profile logic 512, the model-response profile logic 514, the model-prompt profile logic 516, the user-session profile logic 518, the user-prompt profile logic 520, the user-response profile logic 522, the security action logic 524, and/or the session defining logic 528 may utilize the anomaly detection AI model to implement at least a portion of its functionality.

In some example embodiments, any one or more of the AI model(s) 526 includes a neural network that uses the artificial intelligence to determine (e.g., predict) relationships between at least a subset of the AI prompts 538 (including the tokens therein), contextual information that includes context regarding the AI prompt(s) in at least the subset of the AI prompts 538, and confidences in the relationships. The neural network uses those relationships to determine at least a subset of the AI responses 540 that are to be provided in response to the AI prompt(s) in at least the subset of the AI prompts 538. For example, attributes of the AI prompt(s) and potentially example AI prompt(s) may be compared to determine similarities and differences between those attributes. In accordance with this example, the neural network may use those similarities and differences to determine corresponding AI response(s).

In the anomaly aspect, the anomaly detection AI model includes a neural network that uses the artificial intelligence to determine (e.g., predict) relationships between at least a subset of the AI prompts 538 (including the tokens therein), at least a subset of the AI responses 540, corresponding session(s) (e.g., model sessions and/or user sessions), the incoming AI prompt 542 (including tokens therein), contextual information that includes context regarding the AI prompt(s) in at least the subset of the AI prompts 538, and confidences in the relationships. In accordance with this aspect, the neural network uses those relationships to determine whether the incoming AI prompt 542 is anomalous. For example, attributes of the AI prompt(s), the AI response(s), the corresponding session(s), and potentially example AI prompt(s), example AI response(s), and example session(s) may be compared to determine similarities and differences between those attributes. In accordance with this example, the neural network may use those similarities and differences to determine whether the incoming AI prompt 542 is anomalous.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the profile-based anomaly detection logic 508 employs (e.g., includes) a feed forward neural network to train the AI model(s) 526 and/or the anomaly detection AI model, which are used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates an intent model (e.g., to determine intent associated with the AI prompts 538 for use in determining the AI responses 540) by utilizing information, such as AI prompts (e.g., at least a subset of the AI prompts 538), contextual information, relationships between any of the foregoing, and AI-based confidences that are derived therefrom. In the anomaly aspect, the transformer-based neural network generates an anomaly detection model (e.g., to determine whether incoming AI prompts, such as at least a subset of the AI prompts 538 (including the tokens therein), at least a subset of the AI responses 540, corresponding session(s) (e.g., model sessions and/or user sessions), the incoming AI prompt 542 (including tokens therein), contextual information, relationships between any of the foregoing, and AI-based confidences that are derived therefrom.

In example embodiments, the AI prompts 538 include training logic, and the AI model(s) 526 and the anomaly detection AI model include inference logic. The training logic is configured to train an AI algorithm that the inference logic uses to determine (e.g., infer) the AI-based confidences. For instance, the training logic may provide sample AI prompts, sample AI responses, sample sessions, and sample contextual information as inputs to the AI algorithm to train the AI algorithm. The sample data may be labeled. The AI algorithm may be configured to derive relationships between the features (e.g., at least a subset of the AI prompts 538 (including the tokens therein), at least a subset of the AI responses 540, corresponding session(s) (e.g., model sessions and/or user sessions), and/or the incoming AI prompt 542 (including tokens therein)) and the resulting AI-based confidences. The inference logic is configured to utilize the AI algorithm, which is trained by the training logic, to determine the AI-based confidence when the features are provided as inputs to the algorithm.

In an example embodiment, any one or more of the AI model(s) 526 and/or the anomaly detection AI model includes (e.g., is) a generative language model. A generative language model is an AI model that is capable of generating original text output based on sample data. Examples of a generative language model include but are not limited to a generative pre-trained transformer 3 (a.k.a., GPT-3®) model and a generative pre-trained transformer 4 (a.k.a. GPT-4®) model, developed and distributed by OpenAI, Inc.; a large language model Meta AI (a.k.a. LLaMA®) model, developed and distributed by Meta Platforms Inc.; a language model for dialogue applications (a.k.a., LaMDA®) model and a Gemini® model, developed and distributed by Google LLC; and a BigScience large open-science open-access multilingual language model (a.k.a. BLOOM) model, developed and distributed by the BigScience collaborative initiative. A generative language model may use any suitable relevancy determination and/or ranking technique. For instance, the generative language model may use a BM25 (a.k.a. Okapi BM25) ranking function to perform its analysis (e.g., based on keywords).

In another example embodiment, any one or more of the AI model(s) 526 and/or the anomaly detection AI model includes a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3® and GPT-4® models, developed and distributed by OpenAI, Inc.; the LLaMA® model, developed and distributed by Meta Platforms Inc.; and a pathways language model (a.k.a., PaLM®) model and the Gemini® model, developed and distributed by Google LLC.

In yet another example embodiment, any one or more of the AI model(s) 526 and/or the anomaly detection AI model includes an embedding model. An embedding model is an AI model that uses deep learning to convert data into vectors, which represent attributes of the data, and that compares at least a subset of the vectors to determine an extent to which the vectors that are included in the subset are similar. For instance, each vector may represent a semantic meaning of a one or more AI prompts, one or more AI responses, or one or more sessions (e.g., model session(s) or user session(s)).

In still another example embodiment, any one or more of the AI model(s) 526 and/or the anomaly detection AI model includes multiple types of AI models. Weights may be applied to the responses generated by the respective types of AI models. For example, any one or more of the AI model(s) 526 and/or the anomaly detection AI model may include a generative AI model and an embedding model. In accordance with this example, a first weight may be applied to a first response generated by the generative AI model to provide a first weighted response, and a second weight that is different from the first weight may be applied to a second response of the embedding model to provide a second weighted response. Any one or more of the AI model(s) 526 and/or the anomaly detection AI model may combine (e.g., sum) the first weighted response and the second weighted response to generate a response of the respective AI model.

In an example embedding embodiment, generating the model-session profile at step 202 includes generating a model-session feature vector by embedding at least a subset of the model sessions. In an aspect, the model-session profile logic 512 generates the model-session feature vector. For instance, the model-session profile logic 512 may generate the model-session feature vector using an AI model, such as AI model(s) 526. In accordance with this embodiment, generating the model-response profile at step 204 includes generating a model-response feature vector by embedding at least a subset of the AI responses. In an aspect, the model-response profile logic 514 generates the model-response feature vector (e.g., using an AI model). In further accordance with this embodiment, generating the user-session profiles at step 206 includes generating user-session feature vectors by embedding respective subsets of the AI prompts that are received from the users at the AI model during the user sessions and respective subsets of the AI responses that are generated by the AI model in response to the respective subsets of the AI prompts. In an aspect, the user-session profile logic 518 generates the user-session feature vectors (e.g., using an AI model). In further accordance with this embodiment, generating the user-prompt profiles at step 208 includes generating user-prompt feature vectors by embedding respective subsets of the AI prompts that are received from the respective users at the AI model. In an aspect, the user-prompt profile logic 520 generates the user-prompt feature vectors. In further accordance with this embodiment, triggering the execution of the instruction at step 210 causes the security action to be performed with regard to the incoming AI prompt as a result of a difference (e.g., distance) between an embedding that represents the incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to the difference threshold.

In an aspect of the embedding embodiment, the anomaly detection AI model mentioned above includes (e.g., is) an embedding model. Accordingly, the embedding that represents the incoming AI prompt, the model-session feature vector, the model-response feature vector, the user-session feature vectors, and the user-prompt feature vectors may be generated using the embedding model. In an aspect, the embedding model is an encoder-only model. One example of an encoder-only model is the bidirectional encoder representations from transformers (BERT™) model, which is developed and distributed by Google LLC. In another aspect, the embedding model is a decoder-only model. In yet another aspect, the embedding model is an encoder-decoder model. One example of an encoder-decoder model is the FLAN-T5™ model, which is developed and distributed by Google LLC.

In another aspect of the embedding embodiment, the embedding model determines the relationships between the incoming AI prompt 542 (e.g., attributes of the incoming AI prompt 542) and the model-session profile, the model-response profile, at least a subset of the user-session profiles, and/or at least a subset of the user-prompt profiles. In accordance with this aspect, the embedding model determines the relationships based on (e.g., based at least on) distance(s) between the embedding that represents the incoming AI prompt and the model-session feature vector, the model-response feature vector, the first identified feature vector (which represents at least the subset of the user-session feature vectors), and/or the second identified feature vector (which represents at least the subset of the user-prompt feature vectors). The terms "embedding" and "feature vector" are synonymous. An embedding (a.k.a. a feature vector) is a numerical representation of data (e.g., one or more of the AI prompts 538, one or more of the AI responses 540, one or more corresponding sessions (e.g., user session (s) or model session(s)), or a description or summary thereof). For instance, the embedding may be generated by converting the data (e.g., text) into a vector (e.g., an array of numbers). In an example implementation, the embedding represents the meaning and the context of the data. In accordance with this implementation, the distance between a first embedding and a second embedding corresponds to a strength of a relationship (e.g., similarity) between first underlying data (e.g., first AI prompt(s), first AI response(s), or first session(s)) represented by the first embedding and second underlying data (e.g., second AI prompt(s), second AI response(s), or second session(s)) represented by the second embedding. For instance, the distance being relatively shorter indicates that the first underlying data represented by the first embedding corresponds to the second underlying data represented by the second embedding to a relatively greater extent, whereas the distance being relatively longer indicates that the first underlying data represented by the first embedding corresponds to the second underlying data represented by the second embedding to a relatively lesser extent.

The distance between a first embedding and a second embedding may be any suitable type of distance, including but not limited to a Euclidian distance (a.k.a. Pythagorean distance), a Manhattan distance, or a Cosine distance. A Euclidian distance between two vectors is the length of the shortest line between the vectors. For example, the Euclidian distance, $D_E$, between two 2-dimensional vectors (a, b) and (x, y) may be represented as $D_E=[(a-x)^2+(b-y)^2]^{\wedge}(1/2)$. In another example, the Euclidian distance, $D_E$, between two 3-dimensional vectors (a, b, c) and (x, y, z) may be represented as $D_E=[(a-x)^2+(b-y)^2+(c-z)^2]^{\wedge}(1/2)$. A Manhattan distance between two vectors is a sum of absolute differences between corresponding components of the vectors. For example, the Manhattan distance, $D_M$, between two 2-dimensional vectors (a, b) and (x, y) may be represented as $D_M=Abs(a-x)+Abs(b-y)$. In another example, the Manhattan distance, $D_M$, between two 3-dimensional vectors (a, b, c) and (x, y, z) may be represented as $D_M=Abs(a-x)+Abs(b-y)+Abs(c-z)$. A Cosine distance between two vectors is equal to a dot product of the vectors divided by a product of the magnitudes of the vectors. Accordingly, the Cosine distance, $D_C$, between vectors X and Y may be represented as $D_C=(X \cdot Y)/(\|X\|*\|Y\|)$.

An embedding that represents multiple AI prompts, AI responses, or sessions may be a combination (e.g., average or median) of respective embeddings of the AI prompts, the AI responses, or the sessions.

In yet another aspect of the embedding embodiment, the model-session feature vector, the model-response feature vector, the user-session feature vectors, and the user-prompt feature vectors are fixed length feature vectors having a common (e.g., same) fixed length.

In still another aspect of the embedding embodiment, the model-session feature vector represents a normal distribution of the model sessions; the model-response feature vector represents a normal distribution of at least the subset of the AI responses; the user-session feature vectors represent normal distributions of the respective subsets of the AI prompts that are received from the users at the AI model during the user sessions and the respective subsets of the AI responses that are generated by the AI model in response to the respective subsets of the AI prompts; and the user-prompt feature vectors represent normal distributions of the subsets of the AI prompts that are received from the users at the AI model. A normal distribution (a.k.a. Gaussian distribution) is a type of continuous probability distribution for a real-valued random variable. The normal distribution may be represented using the following equation:

$$f(x) = [1/(2\pi\sigma^{\wedge}2)^{\wedge}0.5]^{*}e^{\wedge}-[(x-\mu)^{\wedge}2/(20^{\wedge}2)] \qquad \text{Equation 1}$$

where $\mu$ is the mean (a.k.a. expectation), median, and mode of the distribution, and $\sigma^2$ is the variance of the distribution.

In another aspect of the embedding embodiment, the model-session feature vector is an embedding of a single model session from the model sessions.

In yet another aspect of the embedding embodiment, the model-session feature vector is an embedding of an aggregation of the model sessions.

In still another aspect of the embedding embodiment, the model-response feature vector is an embedding of a single AI response from the AI responses.

In another aspect of the embedding embodiment, the model-response feature vector is an embedding of an aggregation of the AI responses.

In yet another aspect of the embedding embodiment, the first identified feature vector represents a single user-session feature vector in the user-session feature vectors.

In still another aspect of the embedding embodiment, the first identified feature vector represents an aggregation of the user-session feature vectors.

In another aspect of the embedding embodiment, the second identified feature vector represents a single user-prompt feature vector in the user-prompt feature vectors.

In yet another aspect of the embedding embodiment, the second identified feature vector represents an aggregation of the user-prompt feature vectors.

In still another aspect of the embedding embodiment, the model-session feature vector, the model-response feature vector, the user-session feature vectors, and the user-prompt feature vectors are generated using a cross-lingual language model. A cross-lingual language model is an AI model that is capable of processing natural language prompts written in respective natural languages and that is capable of generating AI responses to AI prompts in respective natural languages. In an example implementation, the model-session profile logic 512 generates the model-session feature vector using the cross-lingual language model; the model-response profile logic 514 generates the model-response feature vector using the cross-lingual language model; the user-session profile logic 518 generates the user-session feature vectors using the cross-lingual language model; and/or the user-prompt profile logic 520 generates the user-prompt feature vectors using the cross-lingual language model.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 further includes assigning anomaly scores to the incoming AI prompt. The anomaly scores represent respective differences between the incoming AI prompt and the model-session profile, the model-response profile, at least the subset of the user-session profiles, and at least the subset of the user-prompt profiles. In an aspect, the anomaly scores are assigned without requiring labeled data or prior knowledge of anomalies. In an example implementation, the anomaly score logic 532 assigns anomaly scores 566 to the incoming AI prompt 542. The anomaly scores 566 represent respective differences between the incoming AI prompt 542 and the model-session profile 552, the model-response profile 554, at least the subset of the user-session profiles 558, and at least the subset of the user-prompt profiles 560. In accordance with this embodiment, triggering the execution of the instruction at step 210 causes the security action to be performed with regard to the incoming AI prompt as a result of an anomaly score, which is included in the anomaly scores, being greater than or equal to an anomaly score threshold. In an example implementation, by triggering the execution of the instruction, the trigger logic 534 causes the security action 568 to be performed with regard to the incoming AI prompt 542 as a result of the anomaly score, which is included in the anomaly scores 566, being greater than or equal to an anomaly score threshold 536.

In a normal distribution aspect of this embodiment, the anomaly scores correspond to (e.g., are proportional to) the respective differences between the incoming AI prompt and a normal distribution of the model sessions represented by the model-session profile, a normal distribution of the AI responses represented by the model-response profile, a normal distribution of the user sessions represented by at least the subset of the user-session profiles, and a normal distribution of subsets of the AI prompts represented by at least the subset of the user-prompt profiles. In an example implementation, the anomaly scores 566 correspond to the respective differences between the incoming AI prompt 542 and a normal distribution of the model sessions represented by the model-session profile 552, a normal distribution of the AI responses 540 represented by the model-response profile 554, a normal distribution of the user sessions represented by at least the subset of the user-session profiles 558, and a normal distribution of subsets of the AI prompts 538 represented by at least the subset of the user-prompt profiles 560. In an aspect, the normal distribution logic 530 generates normal distributions 564, which include the normal distribution of the model sessions represented by the model-session profile 552, the normal distribution of the AI responses 540 represented by the model-response profile 554, the normal distribution of the user sessions represented by at least the subset of the user-session profiles 558, and the normal distribution of subsets of the AI prompts 538 represented by at least the subset of the user-prompt profiles 560. In accordance with this aspect, the anomaly score logic 532 generates the anomaly scores 566 by comparing the incoming AI prompt 542 and the normal distributions 564.

In an example of the normal distribution aspect, the method of flowchart 200 further includes generating the normal distribution of the model sessions represented by the model-session profile, the normal distribution of the AI responses represented by the model-response profile, the normal distribution of the user sessions represented by at least the subset of the user-session profiles, and the normal distribution of subsets of the AI prompts represented by at least the subset of the user-prompt profiles using a one-class classifier. A one-class classifier is an AI model that is trained to identify instances of a single class (i.e., a single type) and to distinguish the instances of the single class from instances of other classes. In an example, the one-class classifier uses an unsupervised learning method. In an example implementation, the model-session profile logic 512 generates the normal distribution of the model sessions represented by the model-session profile 552 using a one-class classifier; the model-response profile logic 514 generates the normal distribution of the AI responses 540 represented by the model-response profile 554 using the one-class classifier; the user-session profile logic 518 generates the normal distribution of the user sessions represented by at least the subset of the user-session profiles 558 using the one-class classifier; and/or the user-prompt profile logic 520 generates the normal distribution of subsets of the AI prompts represented by at least the subset of the user-prompt profiles 560 using the one-class classifier.

In a classification aspect of this embodiment, the method of flowchart 200 further includes classifying the incoming AI prompt as an anomalous AI prompt as the result of the anomaly score, which is included in the anomaly scores, being greater than or equal to the anomaly score threshold. In an example implementation, the trigger logic 534 classifies the incoming AI prompt 542 as an anomalous AI prompt as the result of the anomaly score, which is included in the anomaly scores 566, being greater than or equal to the anomaly score threshold 536. In accordance with the classification aspect, triggering the execution of the instruction at step 210 causes the security action to be performed with regard to the incoming AI prompt as a result of the incoming AI prompt being classified as the anomalous AI prompt.

In another example embodiment, the method of flowchart 200 further includes generating user-response profiles for the users. A user-response profile represents a semantic meaning of a respective subset of the AI responses that is generated by the AI model in response to a subset of the AI prompts that is received from a respective user at the AI model. In an example implementation, the user-response profile logic 522 generates user-response profiles 562 for the users. Each of the user-response profiles 562 may represent a semantic meaning of a respective subset of the AI responses 540 that is generated by the AI model in response to a subset of the AI prompts 538 that is received from a respective user at the AI model. In accordance with this embodiment, triggering the execution of the instruction at step 210 causes the security action to be performed with regard to the incoming AI prompt further as a result of a difference between the incoming AI prompt and a user-response profile in the user-response profiles being greater than or equal to a second difference threshold. In an example implementation, by triggering the execution of the instruction, the security action logic 524 causes the security action to be performed with regard to the incoming AI prompt 542 further as a result of a difference between the incoming AI prompt 542 and a user-response profile in the user-response profiles 562 being greater than or equal to a second difference threshold. The difference threshold 570 and the second difference threshold may be same or different.

As shown in FIG. 3, the method of flowchart 300 begins at step 302. In step 302, a model-session feature vector is generated in a model-session profile, which represents semantic meanings of model sessions of artificial intelligence (AI) models, by embedding at least a subset of the model sessions (e.g., using an AI model, such as one or more of the AI model(s) 526). A model session includes a respective subset of AI prompts that is received by an AI model during the model session and a respective subset of AI responses that is generated by the AI model in response to the respective subset of the AI prompts. In an example implementation, the model-session profile logic 512 generates the model-session feature vector in a model-session profile 552 that represents semantic meanings of model sessions of the AI models, which are included in the AI model(s) 526. The model-session profile logic 512 generates the model-session feature vector by embedding at least a subset of the model sessions. A model session includes a respective subset of AI prompts 538 that is received by an AI model during the model session and a respective subset of AI responses 540 that is generated by the AI model in response to the respective subset of the AI prompts 538.

At step 304, a model-response feature vector is generated in a model-response profile, which represents semantic meanings of the AI responses that are generated by the AI models, by embedding at least a subset of the AI responses (e.g., using an AI model). In an example implementation, the model-response profile logic 514 generates the model-response feature vector in a model-response profile 554 that represents semantic meanings of the AI responses 540, which are generated by the AI models. The model-response profile logic 514 generates the model-response feature vector by embedding at least a subset of the AI responses 540.

At step 306, user-session feature vectors are generated in user-session profiles, which represent semantic meanings of user sessions of users with regard to the AI models, by embedding the user sessions (e.g., using an AI model). The user sessions include respective second subsets of the AI prompts that are received among the AI models from the users during the user sessions and respective second subsets of the AI responses that are generated in response to the respective second subsets of the AI prompts. In an example implementation, the user-session profile logic 518 generates the user-session feature vectors in user-session profiles 558, which represent semantic meanings of user sessions of users with regard to the AI models, by embedding the user sessions. The user sessions include respective second subsets of the AI prompts 538 that are received among the AI models from the users during the user sessions and respective second subsets of the AI responses 540 that are generated in response to the respective second subsets of the AI prompts 538.

At step 308, user-prompt feature vectors are generated in user-prompt profiles for the users by embedding respective third subsets of the AI prompts that are received among the AI models from the users (e.g., using an AI model). A user-prompt profile represents semantic meanings of respective AI prompts in a subset of the AI prompts that is received among the AI models from a respective user. In an example implementation, the user-prompt profile logic 520 generates the user-prompt feature vectors in user-prompt profiles 560 for the users by embedding respective third subsets of the AI prompts 538 that are received among the AI models from the users. Each of the user-prompt profiles 560 may represent semantic meanings of respective AI prompts in a subset of the AI prompts 538 that is received among the AI models from a respective user.

At step 310, execution of an instruction is triggered as a result of a difference between an embedding that represents an incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to a difference threshold. Triggering the execution of the instruction causes a security action to be performed with regard to the incoming AI prompt. In an aspect, triggering the execution of the instruction, and thereby causing the security action to be performed, at step 310 increases security of the AI model and/or a user from whom the incoming AI prompt is received. In another aspect, triggering the execution of the instruction at step 310 reduces an amount of time and/or resources (e.g., processor cycles, memory, network bandwidth) that is consumed by a computing system (e.g., computing system 500) to determine whether the incoming AI prompt is anomalous. By reducing the amount of time and/or resources that is consumed to determine whether the incoming AI prompt is anomalous, efficiency of the computing system may be increased. In an example implementation, the security action logic 524 triggers the execution of the instruction as a result of a difference between an embedding that represents an incoming AI prompt 542 and the model-session feature vector, the model-response feature vector, the first identified feature vector, or the second identified feature vector being greater than or equal to a difference threshold 570. By triggering the execution of the instruction, the security analysis logic 524 causes a security action 568 to be performed with regard to the incoming AI prompt 542.

In an example embodiment, at least the subset of the user-session feature vectors includes a single user-session feature vector from the user-session feature vectors.

In another example embodiment, at least the subset of the user-session feature vectors includes an aggregation of the user-session feature vectors.

In yet another example embodiment, at least the subset of the user-prompt feature vectors includes a single user-prompt feature vector from the user-prompt feature vectors.

In still another example embodiment, at least the subset of the user-prompt feature vectors includes an aggregation of the user-prompt feature vectors.

In an example embodiment, the model-session feature vector is an embedding of an aggregation of the model sessions of the AI models.

In another example embodiment, the model-response feature vector is an embedding of an aggregation of the AI responses that are generated by the AI models.

In yet another example embodiment, the first identified feature vector represents a single user-session feature vector in the user-session feature vectors.

In still another example embodiment, the first identified feature vector represents an aggregation of the user-session feature vectors.

In another example embodiment, the second identified feature vector represents a single user-prompt feature vector in the user-prompt feature vectors.

In yet another example embodiment, the second identified feature vector represents an aggregation of the user-prompt feature vectors.

In still another example embodiment, the model-session feature vector, the model-response feature vector, the user-session feature vectors, and the user-prompt feature vectors are generated using a cross-lingual language model.

In another example embodiment, the model-session feature vector represents a normal distribution of the model sessions represented by the model-session profile. In accordance with this embodiment, the model-response feature vector represents a normal distribution of the AI responses represented by the model-response profile. In further accordance with this embodiment, the user-session feature vectors represent normal distributions of respective subsets of the user sessions. In further accordance with this embodiment, the user-prompt feature vectors represent normal distributions of the respective third subsets of the AI prompts that are received among the AI models from the users. The normal distributions may be generated using a one-class classifier, though the example embodiments are not limited in this respect.

In some example embodiments, one or more steps 302, 304, 306, 308, and/or 310 of flowchart 300 may not be performed. Moreover, steps in addition to or in lieu of steps 302, 304, 306, 308, and/or 310 may be performed. For instance, in an example embodiment, the method of flowchart 300 further includes generating user-response feature vectors in user-response profiles for the users by embedding respective fourth subsets of the AI prompts that are received among the AI models from the users. A user-response profile represents a semantic meaning of a respective subset of the AI prompts that is received among the AI models from a respective user. In an example implementation, the user-response profile logic 522 generates the user-response feature vectors in user-response profiles 562 for the users by embedding respective fourth subsets of the AI prompts 538 that are received among the AI models from the users. A user-response profiles 562 represents a semantic meaning of a respective subset of the AI prompts 538 that is received among the AI models from a respective user. In accordance with this embodiment, triggering the execution of the instruction at step 310 causes the security action 568 to be performed with regard to the incoming AI prompt 542 further as a result of a difference between the embedding that represents the incoming AI prompt 542 and a third identified feature vector that represents at least a subset of the user-response feature vectors being greater than or equal to a second difference threshold. The difference threshold 570 and the second difference threshold may be same or different.

As shown in FIG. 4A, the method of flowchart 400 begins at step 402. In step 402, a model-session profile is generated. The model-session profile represents semantic meanings of model sessions of AI models. A model session includes a respective subset of AI prompts received by an AI model during the model session and a respective subset of AI responses generated by the AI model in response to the respective subset of the AI prompts. In an example implementation, the model-session profile logic 512 generates a model-session profile 552 that represents the semantic meanings of the model sessions of the AI models, which are included among the AI model(s) 526.

At step 404, a model-response profile is generated. The model-response profile represents semantic meanings of a plurality of AI responses that are generated by the AI models in response to a plurality of respective AI prompts. In an example implementation, the model-response profile logic 514 generates a model-response profile 554 that represents semantic meanings of a plurality of AI responses 540 that are generated by the AI models in response to a plurality of respective AI prompts 538.

At step 406, a model-prompt profile is generated. The model-prompt profile represents semantic meanings of the plurality of AI prompts. In an example implementation, the model-prompt profile logic 516 generates a model-prompt profile 556 that represents semantic meanings of the plurality of AI prompts 538.

At step 408, user-session profiles are generated. The user-session profiles represent semantic meanings of user sessions of users with regard to the AI models. A user session includes a respective subset of the plurality of AI prompts that is received from a user at an AI model during the user session and a respective subset of the plurality of AI responses that is generated by the AI model in response to the respective subset of the plurality of AI prompts. In an example implementation, the user-session profile logic 518 generates user-session profiles 558 that represent semantic meanings of user sessions of users with regard to the AI models. A user session includes a respective subset of the plurality of AI prompts 538 that is received from a user at an AI model during the user session and a respective subset of the plurality of AI responses 540 that is generated by the AI model in response to the respective subset of the plurality of AI prompts 538. Upon completion of step 408, flow continues to step 410 shown in FIG. 4B.

At step 410, user-prompt profiles are generated for the users. A user-prompt profile represents semantic meanings of respective AI prompts in a respective subset of the plurality of AI prompts that is received among the AI models from a respective user. In an example implementation, the user-prompt profile logic 520 generates user-prompt profiles 560 for the users. Each of the user-prompt profiles may represent semantic meanings of respective AI prompts in a respective subset of the plurality of AI prompts 538 that is received among the AI models from a respective user.

At step 412, user-response profiles are generated for the users. A user-response profile represents semantic meanings of respective AI responses in a respective subset of the plurality of AI responses that is generated by at least a subset of the AI models in response to a respective subset of the plurality of AI prompts that is received from a respective user among at least the subset of the AI models. In an example implementation, the user-response profile logic 522 generates user-response profiles 562 for the users. Each of the user-response profiles 562 may represent semantic meanings of respective AI responses in a respective subset of the plurality of AI responses 540 that is generated by at least a subset of the AI models in response to a respective subset of the plurality of AI prompts 538 that is received from a respective user among at least the subset of the AI models.

At step 414, execution of an instruction is triggered as a result of a difference between an incoming AI prompt and the model-session profile, the model-response profile, the model-prompt profile, at least a subset of the user-session profiles, at least a subset of the user-prompt profiles, or at least a subset of the user-response profiles being greater than or equal to a difference threshold. Triggering the execution of the instruction causes a security action to be performed with regard to the incoming AI prompt. In an aspect, triggering the execution of the instruction, and thereby causing the security action to be performed, at step 414 increases security of the AI model and/or a user from whom the incoming AI prompt is received. In another aspect, triggering the execution of the instruction at step 414 reduces an amount of time and/or resources (e.g., processor cycles, memory, network bandwidth) that is consumed by a computing system (e.g., computing system 500) to determine whether the incoming AI prompt is anomalous. By reducing the amount of time and/or resources that is consumed to determine whether the incoming AI prompt is anomalous, efficiency of the computing system may be increased.

In an example implementation, the security action logic 524 triggers the execution of the instruction as a result of a difference between an incoming AI prompt 542 and the model-session profile 552, the model-response profile 554, the model-prompt profile 556, at least a subset of the user-session profiles 558, at least a subset of the user-prompt profiles 560, or at least a subset of the user-response profiles 562 being greater than or equal to a difference threshold. By triggering the execution of the instruction, the security action logic 524 causes a security action 568 to be performed with regard to the incoming AI prompt 542. In an aspect, the security action 568 includes blocking the AI model from generating an AI response in response to the incoming AI prompt 542. In another aspect, the security action 568 includes causing the AI model to generate an alternative AI response to replace the AI response.

In an example embodiment, the difference between the incoming AI prompt and the model-session profile, the model-response profile, the model-prompt profile, at least the subset of the user-session profiles, at least the subset of the user-prompt profiles, or at least the subset of the user-response profiles is determined using a K-nearest neighbors technique.

In another example embodiment, at least the subset of the user-session profiles includes a single user-session profile from the user-session profiles.

In yet another example embodiment, at least the subset of the user-session profiles includes an aggregation of the user-session profiles.

In still another example embodiment, at least the subset of the user-prompt profiles includes a single user-prompt profile from the user-prompt profiles.

In another example embodiment, at least the subset of the user-prompt profiles includes an aggregation of the user-prompt profiles.

In yet another example embodiment, at least the subset of the user-response profiles includes a single user-prompt profile from the user-prompt profiles.

In still another example embodiment, at least the subset of the user-response profiles includes an aggregation of the user-prompt profiles.

In an example embedding embodiment, generating the model-session profile at step 402 includes generating a model-session feature vector by embedding at least a subset of the model sessions. In an example implementation, the model-session profile logic 512 generates the model-session feature vectors (e.g., using an AI model). In accordance with this embodiment, generating the model-response profile at step 404 includes generating a model-response feature vector by embedding at least a subset of the plurality of AI responses. In an example implementation, the model-response profile logic 514 generates the model-response feature vector by embedding at least a subset of the plurality of AI responses 540 (e.g., using an AI model). In further accordance with this embodiment, generating the model-prompt profile at step 406 includes generating a model-prompt feature vector by embedding at least a subset of the plurality of AI prompts. In an example implementation, the model-prompt profile logic 516 generates the model-prompt feature vector by embedding at least a subset of the plurality of AI prompts 540 (e.g., using an AI model). In further accordance with this embodiment, generating the user-session profiles at step 408 includes generating user-session feature vectors by embedding respective subsets of the plurality of AI prompts that are received among the AI models from the users during the user sessions and respective subsets of the plurality of AI responses that are generated in response to the respective subsets of the plurality of AI prompts. In an example implementation, the user-session profile logic 518 generates the user-session feature vectors by embedding respective subsets of the plurality of AI prompts 538 that are received among the AI models from the users during the user sessions and respective subsets of the plurality of AI responses 540 that are generated in response to the respective subsets of the plurality of AI prompts 538 (e.g., using an AI model).

In further accordance with this embodiment, generating the user-prompt profiles at step 410 includes generating user-prompt feature vectors by embedding respective subsets of the plurality of AI prompts that are received among the AI models from the respective users. In an example implementation, the user-prompt profile logic 520 generates the user-prompt feature vectors by embedding respective subsets of the plurality of AI prompts 538 that are received among the AI models from the respective users (e.g., using an AI model). In further accordance with this embodiment, generating the user-response profiles at step 412 includes generating user-response feature vectors by embedding respective subsets of the plurality of AI responses that are provided to the respective users. In an example implementation, the user-response profile logic 522 generates user-response feature vectors by embedding respective subsets of the plurality of AI responses 540 that are provided to the respective users (e.g., using an AI model).

In further accordance with this embodiment, triggering the execution of the instruction at step 414 causes the security action to be performed with regard to the incoming AI prompt as a result of a difference between an embedding that represents the incoming AI prompt and the model-session feature vector, the model-response feature vector, the model-prompt feature vector, a first identified feature vector that represents at least a subset of the user-session feature vectors, a second identified feature vector that represents at least a subset of the user-prompt feature vectors, or a third identified feature vector that represents at least a subset of the user-response feature vectors being greater than or equal to the difference threshold. In an example implementation, by triggering the execution of the instruction, the security action logic 524 causes the security action 568 to be performed with regard to the incoming AI prompt 542 as a result of a difference between an embedding that represents the incoming AI prompt 542 and the model-session feature vector, the model-response feature vector, the model-prompt feature vector, the first identified feature vector, the second identified feature vector, or the third identified feature vector being greater than or equal to the difference threshold 570.

In an aspect of the embedding embodiment, the embedding that represents the incoming AI prompt, the model-session feature vector, the model-response feature vector, the model-prompt feature vector, the first identified feature vector that represents at least the subset of the user-session feature vectors, the second identified feature vector that represents at least the subset of the user-prompt feature vectors, and the third identified feature vector that represents at least the subset of the user-response feature vectors may be generated using an embedding model. The embedding model may be an encoder-only model, a decoder-only model, or an encoder-decoder model.

In another aspect of the embedding embodiment, the embedding model determines the relationships between the incoming AI prompt 542 (e.g., attributes of the incoming AI prompt 542) and the model-session profile, the model-response profile, the model-prompt profile, at least a subset of the user-session profiles, at least a subset of the user-prompt profiles, and/or at least a subset of the user-response profiles. In accordance with this aspect, the embedding model determines the relationships based on (e.g., based at least on) distance(s) between the embedding that represents the incoming AI prompt and the model-session feature vector, the model-response feature vector, the model-prompt feature vector, the first identified feature vector (which represents at least the subset of the user-session feature vectors), the second identified feature vector (which represents at least the subset of the user-prompt feature vectors), and/or the third identified feature vector (which represents at least the subset of the user-response feature vectors).

In yet another aspect of the embedding embodiment, the model-session feature vector is an embedding of an aggregation of the model sessions of the AI models.

In still another aspect of the embedding embodiment, the model-response feature vector is an embedding of an aggregation of the AI responses that are generated by the AI models.

In another aspect of the embedding embodiment, the first identified feature vector represents a single user-session feature vector in the user-session feature vectors.

In yet another aspect of the embedding embodiment, the first identified feature vector represents an aggregation of the user-session feature vectors.

In still another aspect of the embedding embodiment, the second identified feature vector represents a single user-prompt feature vector in the user-prompt feature vectors.

In another aspect of the embedding embodiment, the second identified feature vector represents an aggregation of the user-prompt feature vectors.

In yet another aspect of the embedding embodiment, the third identified feature vector represents a single user-response feature vector in the user-response feature vectors.

In still another aspect of the embedding embodiment, the third identified feature vector represents an aggregation of the user-response feature vectors.

In another aspect of the embedding embodiment, the model-session feature vector, the model-response feature vector, the model-prompt feature vector, the user-session feature vectors, the user-prompt feature vectors, and the user-response feature vectors are generated using a cross-lingual language model.

In some example embodiments, one or more steps 402, 404, 406, 408, 410, 412, and/or 414 of flowchart 400 may not be performed. Moreover, steps in addition to or in lieu of steps 402, 404, 406, 408, 410, 412, and/or 414 may be performed. For instance, in an example normal distribution embodiment, the method of flowchart 400 further includes generating a normal distribution of the model sessions represented by the model-session profile, a normal distribution of the plurality of AI responses represented by the model-response profile, a normal distribution of the plurality of AI prompts represented by the model-prompt profile, a normal distribution of the user sessions represented by at least the subset of the user-session profiles, a normal distribution of the AI prompts represented by at least the subset of the user-prompt profiles, and a normal distribution of the AI responses represented by at least the subset of the user-response profiles. In an example implementation, the normal distribution logic 530 generates normal distributions 564. In accordance with this implementation, the normal distributions 564 include a normal distribution of the model sessions represented by the model-session profile 552, a normal distribution of the plurality of AI responses 540 represented by the model-response profile 554, a normal distribution of the plurality of AI prompts 538 represented by the model-prompt profile 556, a normal distribution of the user sessions represented by at least the subset of the user-session profiles 558, a normal distribution of the AI prompts represented by at least the subset of the user-prompt profiles 560, and a normal distribution of the AI responses represented by at least the subset of the user-response profiles 562.

In accordance with the normal distribution embodiment, triggering the execution of the instruction at step 414 causes the security action to be performed with regard to the incoming AI prompt as a result of a difference between the incoming AI prompt and the normal distribution of the model sessions represented by the model-session profile, the normal distribution of the plurality of AI responses represented by the model-response profile, the normal distribution of the plurality of AI prompts represented by the model-prompt profile, the normal distribution of the user sessions represented by at least the subset of the user-session profiles, the normal distribution of the AI prompts represented by at least the subset of the user-prompt profiles, or the normal distribution of the AI responses represented by at least the subset of the user-response profiles being greater than or equal to the difference threshold. In an example implementation, by triggering the execution of the instruction, the trigger logic 534 causes the security action 568 to be performed with regard to the incoming AI prompt 542 as a result of a difference between the incoming AI prompt 542 and the normal distribution of the model sessions represented by the model-session profile 552, the normal distribution of the plurality of AI responses 540 represented by the model-response profile 554, the normal distribution of the plurality of AI prompts 538 represented by the model-prompt profile 556, the normal distribution of the user sessions represented by at least the subset of the user-session profiles 558, the normal distribution of the AI prompts represented by at least the subset of the user-prompt profiles 560, or the normal distribution of the AI responses represented by at least the subset of the user-response profiles 562 being greater than or equal to the difference threshold 570. The normal distributions may be generated using a one-class classifier, though the example embodiments are not limited in this respect.

It will be recognized that the computing system 500 may not include one or more of the profile-based anomaly detection logic 508, the model-session profile logic 512, the model-response profile logic 514, the model-prompt profile logic 516, the user-session profile logic 518, the user-prompt profile logic 520, the user-response profile logic 522, the security action logic 524, the AI model(s) 526, the session defining logic 528, the normal distribution logic 530, the anomaly score logic 532, and/or the trigger logic 534. Furthermore, the computing system 500 may include components in addition to or in lieu of the profile-based anomaly detection logic 508, the model-session profile logic 512, the model-response profile logic 514, the model-prompt profile logic 516, the user-session profile logic 518, the user-prompt profile logic 520, the user-response profile logic 522, the security action logic 524, the AI model(s) 526, the session defining logic 528, the normal distribution logic 530, the anomaly score logic 532, and/or the trigger logic 534.

Figure 6:
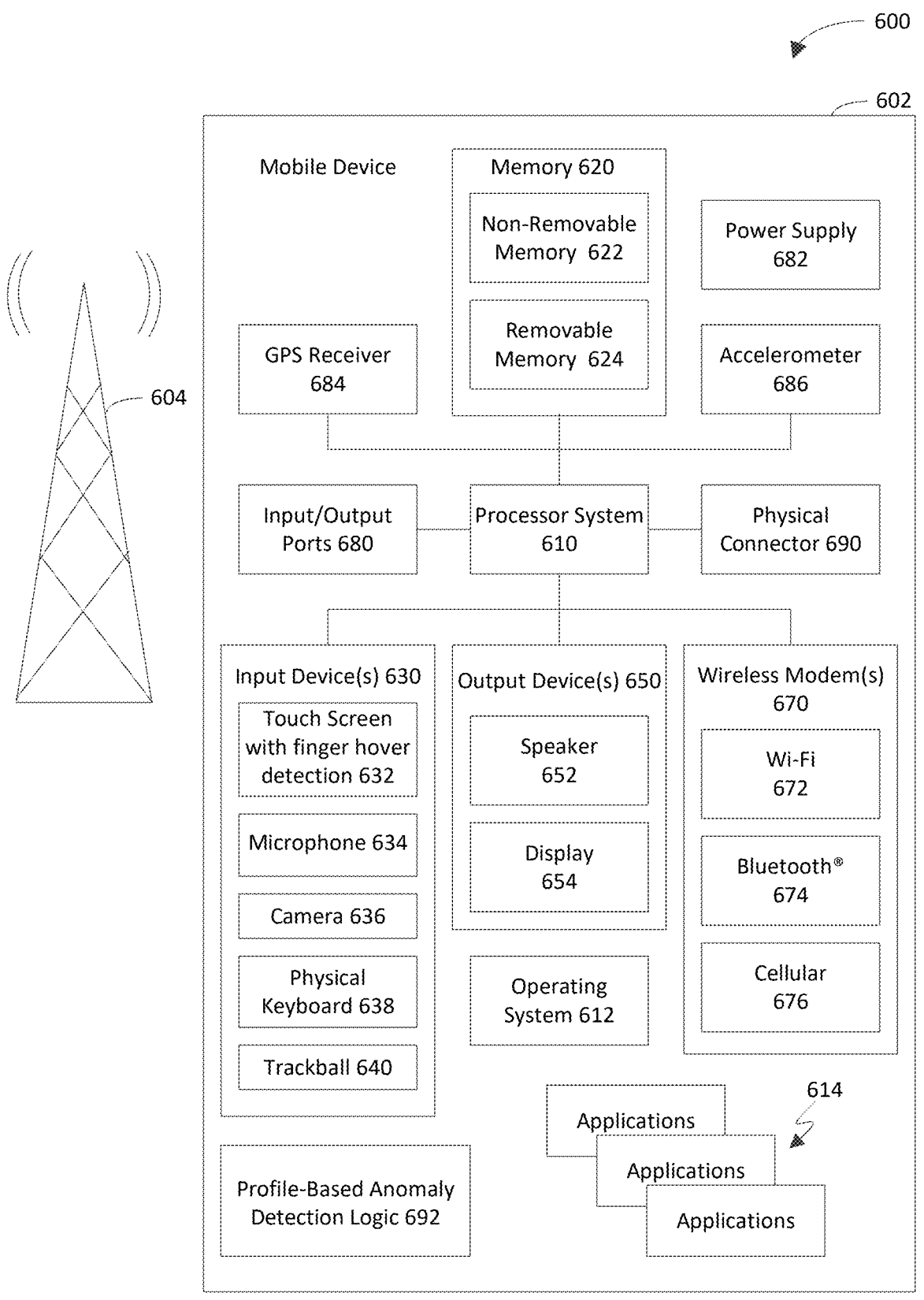
FIG. 6 is a system diagram of an example mobile device in accordance with an embodiment.

FIG. 6 is a system diagram of an example mobile device 600 including a variety of optional hardware and software components, shown generally as 602. Any components 602 in the mobile device may communicate with any other component, though not all connections are shown, for ease of illustration. The mobile device 600 may be any of a variety of computing devices (e.g., cell phone, smartphone, handheld computer, Personal Digital Assistant (PDA), etc.) and may allow wireless two-way communications with one or more mobile communications networks 604, such as a cellular or satellite network, or with a local area or wide area network.

The mobile device 600 includes a processor system 610 (e.g., signal processor, microprocessor, ASIC, or other control and processing logic circuitry) for performing such tasks as signal coding, data processing, input/output processing, power control, and/or other functions. An operating system 612 may control the allocation and usage of the components 602 and support for one or more applications 614 (a.k.a. application programs). The applications 614 may include common mobile computing applications (e.g., email applications, calendars, contact managers, web browsers, messaging applications) and any other computing applications (e.g., word processing applications, mapping applications, media player applications).

The mobile device 600 includes profile-based anomaly detection logic 692, which is operable in a manner similar to the profile-based anomaly detection logic 108 described above with reference to FIG. 1 and/or the profile-based anomaly detection logic 508 described above with reference to FIG. 5.

The mobile device 600 includes memory 620. The memory 620 may include non-removable memory 622 and/or removable memory 624. The non-removable memory 622 may include random access memory (RAM), read-only memory (ROM), flash memory, a hard disk, or other well-known memory storage technologies. The removable memory 624 may include flash memory or a Subscriber Identity Module (SIM) card, which is well known in Global System for Mobile Communications (GSM) systems, or other well-known memory storage technologies, such as "smart cards." The memory 620 may store data and/or code for running the operating system 612 and the applications 614. Example data may include web pages, text, images, sound files, video data, or other data sets to be sent to and/or received from one or more network servers or other devices via one or more wired or wireless networks. Memory 620 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 600 may support one or more input devices 630, such as a touch screen 632, microphone 634, camera 636, physical keyboard 638 and/or trackball 640 and one or more output devices 650, such as a speaker 652 and a display 654. Touch screens, such as the touch screen 632, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 632 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 632 and display 654 may be combined in a single input/output device. The input devices 630 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 612 or applications 614 may include speech-recognition software as part of a voice control interface that allows a user to operate the mobile device 600 via voice commands. Furthermore, the mobile device 600 may include input devices and software that allows for user interaction via a user's spatial gestures, such as detecting and interpreting gestures to provide input to a gaming application.

Wireless modem(s) 670 may be coupled to antenna(s) (not shown) and may support two-way communications between the processor system 610 and external devices, as is well understood in the art. The modem(s) 670 are shown generically and may include a cellular modem 676 for communicating with the mobile communication network 604 and/or other radio-based modems (e.g., Bluetooth® 674 and/or Wi-Fi 672). At least one of the wireless modem(s) 670 is typically configured for communication with one or more cellular networks, such as a GSM network for data and voice communications within a single cellular network, between cellular networks, or between the mobile device and a public switched telephone network (PSTN).

The mobile device 600 may further include at least one input/output port 680, a power supply 682, a satellite navigation system receiver 684, such as a Global Positioning System (GPS) receiver, an accelerometer 686, and/or a physical connector 690, which may be a universal serial bus (USB) port, IEEE 1394 (FireWire) port, and/or RS-232 port. The illustrated components 602 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the profile-based anomaly detection logic 108, the profile-based anomaly detection logic 508, the model-session profile logic 512, the model-response profile logic 514, the model-prompt profile logic 516, the user-session profile logic 518, the user-prompt profile logic 520, the user-response profile logic 522, the security action logic 524, the AI model(s) 526, the session defining logic 528, the normal distribution logic 530, the anomaly score logic 532, the trigger logic 534, flowchart 200, flowchart 300, and/or flowchart 400 may be implemented in hardware, software, firmware, or any combination thereof.

For example, any one or more of the profile-based anomaly detection logic 108, the profile-based anomaly detection logic 508, the model-session profile logic 512, the model-response profile logic 514, the model-prompt profile logic 516, the user-session profile logic 518, the user-prompt profile logic 520, the user-response profile logic 522, the security action logic 524, the AI model(s) 526, the session defining logic 528, the normal distribution logic 530, the anomaly score logic 532, the trigger logic 534, flowchart 200, flowchart 300, and/or flowchart 400 may be implemented, at least in part, as computer program code configured to be executed in one or more processors.

In another example, any one or more of the profile-based anomaly detection logic 108, the profile-based anomaly detection logic 508, the model-session profile logic 512, the model-response profile logic 514, the model-prompt profile logic 516, the user-session profile logic 518, the user-prompt profile logic 520, the user-response profile logic 522, the security action logic 524, the AI model(s) 526, the session defining logic 528, the normal distribution logic 530, the anomaly score logic 532, the trigger logic 534, flowchart 200, flowchart 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
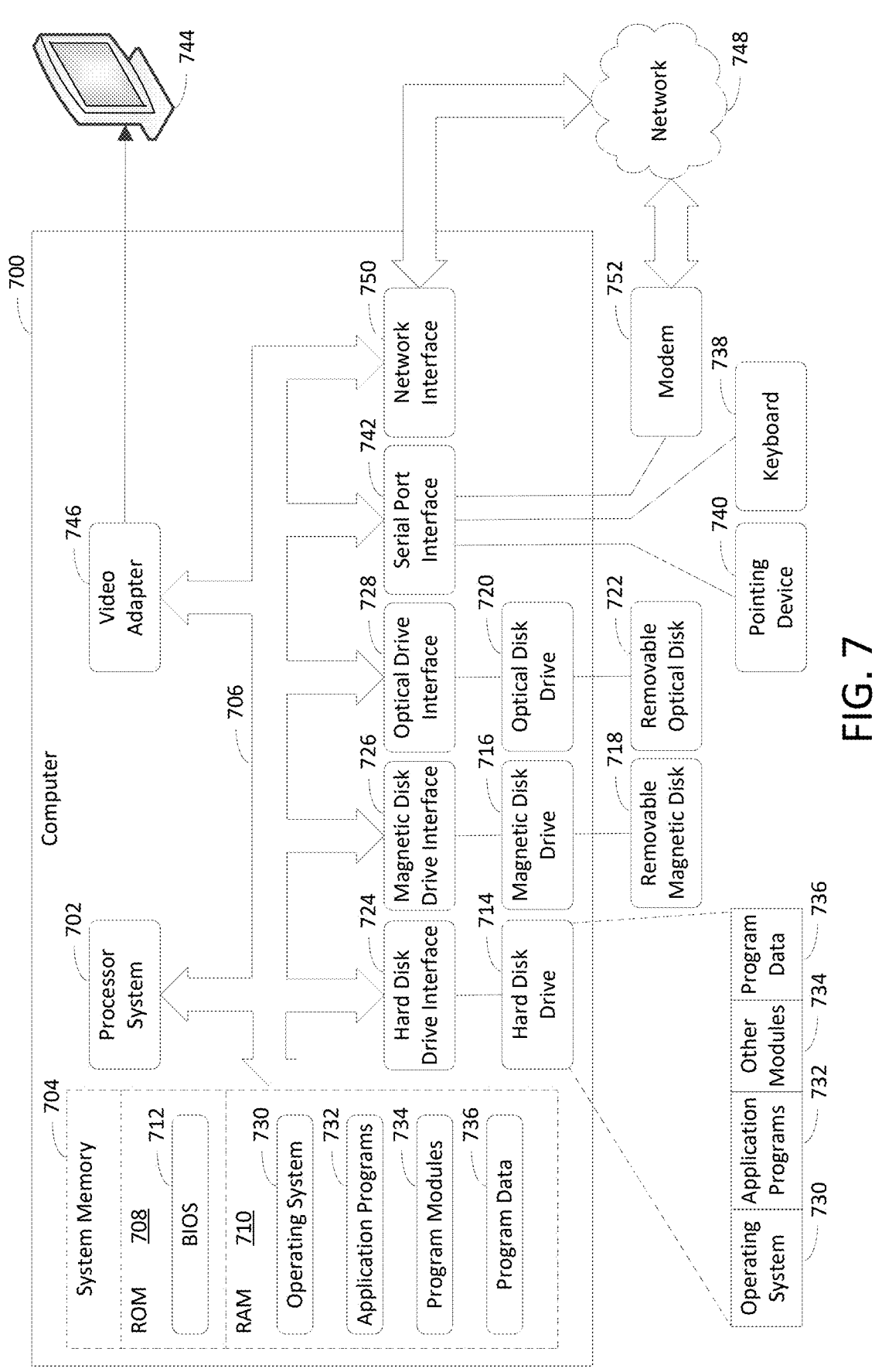
FIG. 7 depicts an example computer in which embodiments may be implemented.

II. Further Discussion of Some Example Embodiments (A1) A first example system (FIG. 1, 102A-102M, 106A-106N; FIG. 5, 500; FIG. 6, 602; FIG. 7, 700) comprises a processor system (FIG. 6, 610; FIG. 7, 702) and a memory (FIG. 6, 620, 622, 624; FIG. 7, 704, 708, 710) that stores computer-executable instructions. The computer-executable instructions are executable by the processor system to at least generate (FIG. 2, 202) a model-session profile (FIG. 5, 552) that represents semantic meanings of model sessions of an artificial intelligence (AI) model (FIG. 5, 526). A model session comprises a first subset of AI prompts (FIG. 5, 538) that is received by the AI model during the model session and a first subset of AI responses (FIG. 5, 540) that is generated by the AI model in response to the first subset of the AI prompts. The computer-executable instructions are executable by the processor system further to at least generate (FIG. 2, 204) a model-response profile (FIG. 5, 554) that represents semantic meanings of the AI responses. The computer-executable instructions are executable by the processor system further to at least generate (FIG. 2, 206) user-session profiles (FIG. 5, 558) that represent semantic meanings of user sessions of users with regard to the AI model. A user session comprises a second subset of the AI prompts that is received from a user at the AI model during the user session and a second subset of the AI responses that is generated by the AI model in response to the second subset of the AI prompts. The computer-executable instructions are executable by the processor system further to at least generate (FIG. 2, 208) user-prompt profiles (FIG. 5, 560) for the users. A user-prompt profile represents a semantic meaning of a third subset of the AI prompts that is received from a user at the AI model. The computer-executable instructions are executable by the processor system further to at least trigger (FIG. 2, 210) execution of an instruction, which causes a security action (FIG. 5, 568) to be performed with regard to an incoming AI prompt (FIG. 5, 542), as a result of a difference between the incoming AI prompt and the model-session profile, the model-response profile, at least a subset of the user-session profiles, or at least a subset of the user-prompt profiles being greater than or equal to a difference threshold (FIG. 5, 570).

(A2) In the example system of A1, wherein the computer-executable instructions are executable by the processor system to at least: assign anomaly scores to the incoming AI prompt, the anomaly scores representing differences between the incoming AI prompt and the model-session profile, the model-response profile, at least the subset of the user-session profiles, and at least the subset of the user-prompt profiles; and trigger the execution of the instruction, which causes the security action to be performed with regard to the incoming AI prompt, as a result of an anomaly score, which is comprised in the anomaly scores, being greater than or equal to an anomaly score threshold.

(A3) In the example system of any of A1-A2, wherein the anomaly scores correspond to the differences between the incoming AI prompt and a normal distribution of the model sessions represented by the model-session profile, a normal distribution of the AI responses represented by the model-response profile, a normal distribution of the user sessions represented by at least the subset of the user-session profiles, and a normal distribution of subsets of the AI prompts represented by at least the subset of the user-prompt profiles.

(A4) In the example system of any of A1-A3, wherein the computer-executable instructions are executable by the processor system further to at least: generate the normal distribution of the model sessions represented by the model-session profile, the normal distribution of the AI responses represented by the model-response profile, the normal distribution of the user sessions represented by at least the subset of the user-session profiles, and the normal distribution of subsets of the AI prompts represented by at least the subset of the user-prompt profiles using a one-class classifier.

(A5) In the example system of any of A1-A4, wherein the computer-executable instructions are executable by the processor system to at least: classify the incoming AI prompt as an anomalous AI prompt as the result of the anomaly score, which is comprised in the anomaly scores, being greater than or equal to the anomaly score threshold; and trigger the execution of the instruction, which causes the security action to be performed with regard to the incoming AI prompt, as a result of the incoming AI prompt being classified as the anomalous AI prompt.

(A6) In the example system of any of A1-A5, wherein the computer-executable instructions are executable by the processor system to at least: generate user-response profiles for the users, a user-response profile representing a semantic meaning of a third subset of the AI responses that is generated by the AI model in response to a subset of the AI prompts that is received from a user at the AI model; and trigger the execution of the instruction causes the security action to be performed with regard to the incoming AI prompt further as a result of a difference between the incoming AI prompt and a user-response profile in the user-response profiles being greater than or equal to a second difference threshold.

(A7) In the example system of any of A1-A6, wherein the computer-executable instructions are executable by the processor system to at least: generate a model-session feature vector, which is comprised in the model-session profile, by embedding at least a subset of the model sessions; generate a model-response feature vector, which is comprised in the model-response profile, by embedding at least a subset of the AI responses; generate user-session feature vectors, which are comprised in the user-session profiles, by embedding respective second subsets of the AI prompts that are received from the users at the AI model during the user sessions and respective second subsets of the AI responses that are generated by the AI model in response to the respective second subsets of the AI prompts; generate user-prompt feature vectors, which are comprised in the user-prompt profiles, by embedding respective third subsets of the AI prompts that are received from the users at the AI model; and trigger the execution of the instruction, which causes the security action to be performed with regard to the incoming AI prompt, as a result of a difference between an embedding that represents the incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to the difference threshold.

(A8) In the example system of any of A1-A7, wherein the model-session feature vector is an embedding of a single model session from the model sessions; and wherein the model-response feature vector is an embedding of a single AI response from the AI responses.

(A9) In the example system of any of A1-A8, wherein the model-session feature vector is an embedding of an aggregation of the model sessions; and wherein the model-response feature vector is an embedding of an aggregation of the AI responses.

(A10) In the example system of any of A1-A9, wherein the first identified feature vector represents a single user-session feature vector in the user-session feature vectors; and wherein the second identified feature vector represents a single user-prompt feature vector in the user-prompt feature vectors.

(A11) In the example system of any of A1-A10, wherein the first identified feature vector represents an aggregation of the user-session feature vectors; and wherein the second identified feature vector represents an aggregation of the user-prompt feature vectors.

(A12) In the example system of any of A1-A11, wherein the computer-executable instructions are executable by the processor system to at least: generate the model-session feature vector, the model-response feature vector, the user-session feature vectors, and the user-prompt feature vectors using a cross-lingual language model.

(B1) A second example system (FIG. 1, 102A-102M, 106A-106N; FIG. 5, 500; FIG. 6, 602; FIG. 7, 700) comprises a processor system (FIG. 6, 610; FIG. 7, 702) and a memory (FIG. 6, 620, 622, 624; FIG. 7, 704, 708, 710) that stores computer-executable instructions. The computer-executable instructions are executable by the processor system to at least generate (FIG. 3, 302) a model-session feature vector in a model-session profile (FIG. 5, 552), which represents semantic meanings of model sessions of artificial intelligence (AI) models (FIG. 5, 526) by embedding at least a subset of the model sessions. A model session comprises a first subset of AI prompts (FIG. 5, 538) that is received by an AI model during the model session and a first subset of AI responses (FIG. 5, 540) that is generated by the AI model in response to the first subset of the AI prompts. The computer-executable instructions are executable by the processor system further to at least generate (FIG. 3, 304) a model-response feature vector in a model-response profile (FIG. 5, 554), which represents semantic meanings of the AI responses that are generated by the AI models, by embedding at least a subset of the AI responses. The computer-executable instructions are executable by the processor system further to at least generate (FIG. 3, 306) user-session feature vectors in user-session profiles (FIG. 5, 558), which represent semantic meanings of user sessions of users with regard to the AI models, which comprise respective second subsets of the AI prompts that are received among the AI models from the users during the user sessions and respective second subsets of the AI responses that are generated in response to the respective second subsets of the AI prompts. The computer-executable instructions are executable by the processor system further to at least generate (FIG. 3, 308) user-prompt feature vectors in user-prompt profiles (FIG. 5, 560) for the users by embedding respective third subsets of the AI prompts that are received among the AI models from the users. The computer-executable instructions are executable by the processor system further to at least trigger (FIG. 3, 310) execution of an instruction, which causes a security action (FIG. 5, 568) to be performed with regard to an incoming AI prompt (FIG. 5, 542), as a result of a difference between an embedding that represents the incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to a difference threshold (FIG. 5, 570).

(B2) In the example system of B1, wherein at least the subset of the user-session feature vectors comprises a single user-session feature vector from the user-session feature vectors; and wherein at least the subset of the user-prompt feature vectors comprises a single user-prompt feature vector from the user-prompt feature vectors.

(B3) In the example system of any of B1-B2, wherein at least the subset of the user-session feature vectors comprises an aggregation of the user-session feature vectors; and wherein at least the subset of the user-prompt feature vectors comprises an aggregation of the user-prompt feature vectors.

(B4) In the example system of any of B1-B3, wherein the model-session feature vector represents a normal distribution of the model sessions represented by the model-session profile; wherein the model-response feature vector represents a normal distribution of the AI responses represented by the model-response profile; wherein the user-session feature vectors represent normal distributions of respective subsets of the user sessions; and wherein the user-prompt feature vectors represent normal distributions of the respective third subsets of the AI prompts that are received among the AI models from the users.

(B5) In the example system of any of B1-B4, wherein the computer-executable instructions are executable by the processor system to at least: generate user-response feature vectors in user-response profiles for the users by embedding respective fourth subsets of the AI prompts that are received among the AI models from the users; and trigger the execution of the instruction, which causes the security action to be performed with regard to the incoming AI prompt, further as a result of a difference between the embedding that represents the incoming AI prompt and a third identified feature vector that represents at least a subset of the user-response feature vectors being greater than or equal to a second difference threshold.

(B6) In the example system of any of B1-B5, wherein the model-session feature vector is an embedding of an aggregation of the model sessions of the AI models.

(B7) In the example system of any of B1-B6, wherein the model-response feature vector is an embedding of an aggregation of the AI responses that are generated by the AI models.

(B8) In the example system of any of B1-B7, wherein the first identified feature vector represents a single user-session feature vector in the user-session feature vectors; and wherein the second identified feature vector represents a single user-prompt feature vector in the user-prompt feature vectors.

(B9) In the example system of any of B1-B8, wherein the first identified feature vector represents an aggregation of the user-session feature vectors; and wherein the second identified feature vector represents an aggregation of the user-prompt feature vectors.

(B10) In the example system of any of B1-B9, wherein the computer-executable instructions are executable by the processor system to at least: generate the model-session feature vector, the model-response feature vector, the user-session feature vectors, and the user-prompt feature vectors using a cross-lingual language model.

(C1) A third example system (FIG. 1, 102A-102M, 106A-106N; FIG. 5, 500; FIG. 6, 602; FIG. 7, 700) comprises a processor system (FIG. 6, 610; FIG. 7, 702) and a memory (FIG. 6, 620, 622, 624; FIG. 7, 704, 708, 710) that stores computer-executable instructions. The computer-executable instructions are executable by the processor system to at least generate (FIG. 4A, 402) a model-session profile (FIG. 5, 552) that represents semantic meanings of model sessions of artificial intelligence (AI) models (FIG. 5, 526). A model session comprises a first subset of AI prompts received by an AI model during the model session and a first subset of AI responses generated by the AI model in response to the first subset of the AI prompts. The computer-executable instructions are executable by the processor system further to at least generate (FIG. 4A, 404) a model-response profile (FIG. 5, 554) that represents semantic meanings of a plurality of AI responses (FIG. 5, 540) that are generated by the AI models in response to a plurality of AI prompts (FIG. 5, 540). The computer-executable instructions are executable by the processor system further to at least generate (FIG. 4A, 406) a model-prompt profile (FIG. 5, 556) that represents semantic meanings of the plurality of AI prompts. The computer-executable instructions are executable by the processor system further to at least generate (FIG. 4A, 408) user-session profiles (FIG. 5, 558) that represent semantic meanings of user sessions of users with regard to the AI models. A user session comprises a second subset of the plurality of AI prompts that is received from a user at an AI model during the user session and a second subset of the plurality of AI responses that is generated by the AI model in response to the second subset of the plurality of AI prompts. The computer-executable instructions are executable by the processor system further to at least generate (FIG. 4B, 410) user-prompt profiles (FIG. 5, 560) for the users. A user-prompt profile represents semantic meanings of respective AI prompts in a third subset of the plurality of AI prompts that is received among the AI models from a user. The computer-executable instructions are executable by the processor system further to at least generate (FIG. 4B, 412) user-response profiles (FIG. 5, 562) for the users. A user-response profile represents semantic meanings of respective AI responses in a third subset of the plurality of AI responses that is generated by an AI model in response to a subset of the plurality of AI prompts that is received from a user at the AI model. The computer-executable instructions are executable by the processor system further to at least trigger (FIG. 4B, 414) execution of an instruction, which causes a security action (FIG. 5, 568) to be performed with regard to an incoming AI prompt (FIG. 5, 542), as a result of a difference between the incoming AI prompt and the model-session profile, the model-response profile, the model-prompt profile, at least a subset of the user-session profiles, at least a subset of the user-prompt profiles, or at least a subset of the user-response profiles being greater than or equal to a difference threshold (FIG. 5, 570).

(C2) In the example system of C1, wherein at least the subset of the user-response profiles comprises a single user-prompt profile from the user-prompt profiles.

(C3) In the example system of any of C1-C2, wherein at least the subset of the user-response profiles comprises an aggregation of the user-prompt profiles.

(C4) In the example system of any of C1-C3, wherein at least the subset of the user-session profiles comprises a single user-session profile from the user-session profiles.

(C5) In the example system of any of C1-C4, wherein at least the subset of the user-session profiles comprises an aggregation of the user-session profiles.

(C6) In the example system of any of C1-C5, wherein at least the subset of the user-prompt profiles comprises a single user-prompt profile from the user-prompt profiles.

(C7) In the example system of any of C1-C6, wherein at least the subset of the user-prompt profiles comprises an aggregation of the user-prompt profiles.

(C8) In the example system of any of C1-C7, wherein the computer-executable instructions are executable by the processor system to at least: generate a normal distribution of the model sessions represented by the model-session profile, a normal distribution of the plurality of AI responses represented by the model-response profile, a normal distribution of the plurality of AI prompts represented by the model-prompt profile, a normal distribution of the user sessions represented by at least the subset of the user-session profiles, a normal distribution of the AI prompts represented by at least the subset of the user-prompt profiles, and a normal distribution of the AI responses represented by at least the subset of the user-response profiles; and trigger the execution of the instruction, which causes the security action to be performed with regard to the incoming AI prompt, as a result of a difference between the incoming AI prompt and the normal distribution of the model sessions represented by the model-session profile, the normal distribution of the plurality of AI responses represented by the model-response profile, the normal distribution of the plurality of AI prompts represented by the model-prompt profile, the normal distribution of the user sessions represented by at least the subset of the user-session profiles, the normal distribution of the AI prompts represented by at least the subset of the user-prompt profiles, or the normal distribution of the AI responses represented by at least the subset of the user-response profiles being greater than or equal to the difference threshold.

(C9) In the example system of any of C1-C8, wherein the computer-executable instructions are executable by the processor system to at least: generate a model-session feature vector, which is comprised in the model-session profile, by embedding at least a subset of the model sessions; generate a model-response feature vector, which is comprised in the model-response profile, by embedding at least a subset of the plurality of AI responses; generate a model-prompt feature vector, which is comprised in the model-prompt profile, by embedding at least a subset of the plurality of AI prompts; generate user-session feature vectors, which are comprised in the user-session profiles, by embedding respective second subsets of the plurality of AI prompts that are received among the AI models from the users during the user sessions and respective second subsets of the plurality of AI responses that are generated in response to the respective second subsets of the plurality of AI prompts; generate user-prompt feature vectors, which are comprised in the user-prompt profiles, by embedding respective third subsets of the plurality of AI prompts that are received among the AI models from the users; generate user-response feature vectors, which are comprised in the user-response profiles, by embedding respective third subsets of the plurality of AI responses that are provided to the users; and trigger the execution of the instruction, which causes the security action to be performed with regard to the incoming AI prompt, as a result of a difference between an embedding that represents the incoming AI prompt and the model-session feature vector, the model-response feature vector, the model-prompt feature vector, a first identified feature vector that represents at least a subset of the user-session feature vectors, a second identified feature vector that represents at least a subset of the user-prompt feature vectors, or a third identified feature vector that represents at least a subset of the user-response feature vectors being greater than or equal to the difference threshold.

(C10) In the example system of any of C1-C9, wherein the model-session feature vector is an embedding of an aggregation of the model sessions of the AI models.

(C11) In the example system of any of C1-C10, wherein the model-response feature vector is an embedding of an aggregation of the AI responses that are generated by the AI models.

(C12) In the example system of any of C1-C11, wherein the first identified feature vector represents a single user-session feature vector in the user-session feature vectors.

(C13) In the example system of any of C1-C12, wherein the first identified feature vector represents an aggregation of the user-session feature vectors.

(C14) In the example system of any of C1-C13, wherein the second identified feature vector represents a single user-prompt feature vector in the user-prompt feature vectors.

(C15) In the example system of any of C1-C14, wherein the second identified feature vector represents an aggregation of the user-prompt feature vectors.

(C16) In the example system of any of C1-C15, wherein the third identified feature vector represents a single user-response feature vector in the user-response feature vectors.

(C17) In the example system of any of C1-C16, wherein the third identified feature vector represents an aggregation of the user-response feature vectors.

(C18) In the example system of any of C1-C17, wherein the computer-executable instructions are executable by the processor system to at least: generate the model-session feature vector, the model-response feature vector, the model-prompt feature vector, the user-session feature vectors, the user-prompt feature vectors, and the user-response feature vectors using a cross-lingual language model.

(D1) A first example method is implemented by a computing system (FIG. 1, 102A-102M, 106A-106N; FIG. 5, 500; FIG. 6, 602; FIG. 7, 700). The method comprises generating (FIG. 2, 202) a model-session profile (FIG. 5, 552) that represents semantic meanings of model sessions of an artificial intelligence (AI) model (FIG. 5, 526). A model session comprises a first subset of AI prompts (FIG. 5, 538) that is received by the AI model during the model session and a first subset of AI responses (FIG. 5, 540) that is generated by the AI model in response to the first subset of the AI prompts. The method further comprises generating (FIG. 2, 204) a model-response profile (FIG. 5, 554) that represents semantic meanings of the AI responses. The method further comprises generating (FIG. 2, 206) user-session profiles (FIG. 5, 558) that represent semantic meanings of user sessions of users with regard to the AI model. A user session comprises a second subset of the AI prompts that is received from a user at the AI model during the user session and a second subset of the AI responses that is generated by the AI model in response to the second subset of the AI prompts. The method further comprises generating (FIG. 2, 208) user-prompt profiles (FIG. 5, 560) for the users. A user-prompt profile represents a semantic meaning of a third subset of the AI prompts that is received from a user at the AI model. The method further comprises triggering (FIG. 2, 210) execution of an instruction, which causes a security action (FIG. 5, 568) to be performed with regard to an incoming AI prompt (FIG. 5, 542), as a result of a difference between the incoming AI prompt and the model-session profile, the model-response profile, at least a subset of the user-session profiles, or at least a subset of the user-prompt profiles being greater than or equal to a difference threshold (FIG. 5, 570).

(D2) In the example method of D1, further comprising: assigning anomaly scores to the incoming AI prompt, the anomaly scores representing differences between the incoming AI prompt and the model-session profile, the model-response profile, at least the subset of the user-session profiles, and at least the subset of the user-prompt profiles; wherein triggering the execution of the instruction causes the security action to be performed with regard to the incoming AI prompt as a result of an anomaly score, which is comprised in the anomaly scores, being greater than or equal to an anomaly score threshold.

(D3) In the example method of any of D1-D2, wherein the anomaly scores correspond to the differences between the incoming AI prompt and a normal distribution of the model sessions represented by the model-session profile, a normal distribution of the AI responses represented by the model-response profile, a normal distribution of the user sessions represented by at least the subset of the user-session profiles, and a normal distribution of subsets of the AI prompts represented by at least the subset of the user-prompt profiles.

(D4) In the example method of any of D1-D3, further comprising: generating the normal distribution of the model sessions represented by the model-session profile, the normal distribution of the AI responses represented by the model-response profile, the normal distribution of the user sessions represented by at least the subset of the user-session profiles, and the normal distribution of subsets of the AI prompts represented by at least the subset of the user-prompt profiles using a one-class classifier.

(D5) In the example method of any of D1-D4, further comprising: classifying the incoming AI prompt as an anomalous AI prompt as the result of the anomaly score, which is comprised in the anomaly scores, being greater than or equal to the anomaly score threshold; wherein triggering the execution of the instruction causes the security action to be performed with regard to the incoming AI prompt as a result of the incoming AI prompt being classified as the anomalous AI prompt.

(D6) In the example method of any of D1-D5, further comprising: generating user-response profiles for the users, a user-response profile representing a semantic meaning of a third subset of the AI responses that is generated by the AI model in response to a subset of the AI prompts that is received from a user at the AI model; wherein triggering the execution of the instruction causes the security action to be performed with regard to the incoming AI prompt further as a result of a difference between the incoming AI prompt and a user-response profile in the user-response profiles being greater than or equal to a second difference threshold.

(D7) In the example method of any of D1-D6, wherein generating the model-session profile comprises: generating a model-session feature vector by embedding at least a subset of the model sessions; wherein generating the model-response profile comprises: generating a model-response feature vector by embedding at least a subset of the AI responses; wherein generating the user-session profiles comprises: generating user-session feature vectors by embedding respective second subsets of the AI prompts that are received from the users at the AI model during the user sessions and respective second subsets of the AI responses that are generated by the AI model in response to the respective second subsets of the AI prompts; wherein generating the user-prompt profiles comprises: generating user-prompt feature vectors by embedding respective third subsets of the AI prompts that are received from the users at the AI model; and wherein triggering the execution of the instruction causes the security action to be performed with regard to the incoming AI prompt as a result of a difference between an embedding that represents the incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to the difference threshold.

(D8) In the example method of any of D1-D7, wherein the model-session feature vector is an embedding of a single model session from the model sessions; and wherein the model-response feature vector is an embedding of a single AI response from the AI responses.

(D9) In the example method of any of D1-D8, wherein the model-session feature vector is an embedding of an aggregation of the model sessions; and wherein the model-response feature vector is an embedding of an aggregation of the AI responses.

(D10) In the example method of any of D1-D9, wherein the first identified feature vector represents a single user-session feature vector in the user-session feature vectors; and wherein the second identified feature vector represents a single user-prompt feature vector in the user-prompt feature vectors.

(D11) In the example method of any of D1-D10, wherein the first identified feature vector represents an aggregation of the user-session feature vectors; and wherein the second identified feature vector represents an aggregation of the user-prompt feature vectors.

(D12) In the example method of any of D1-D11, wherein the model-session feature vector, the model-response feature vector, the user-session feature vectors, and the user-prompt feature vectors are generated using a cross-lingual language model.

(E1) A second example method is implemented by a computing system (FIG. 1, 102A-102M, 106A-106N; FIG. 5, 500; FIG. 6, 602; FIG. 7, 700). The method comprises generating (FIG. 3, 302) a model-session feature vector in a model-session profile (FIG. 5, 552), which represents semantic meanings of model sessions of artificial intelligence (AI) models (FIG. 5, 526), by embedding at least a subset of the model sessions. A model session comprises a first subset of AI prompts (FIG. 5, 538) that is received by an AI model during the model session and a first subset of AI responses (FIG. 5, 540) that is generated by the AI model in response to the first subset of the AI prompts. The method further comprises generating (FIG. 3, 304) a model-response feature vector in a model-response profile (FIG. 5, 554), which represents semantic meanings of the AI responses that are generated by the AI models, by embedding at least a subset of the AI responses. The method further comprises generating (FIG. 3, 306) user-session feature vectors in user-session profiles (FIG. 5, 558), which represent semantic meanings of user sessions of users with regard to the AI models, by embedding the user sessions, which comprise respective second subsets of the AI prompts that are received among the AI models from the users during the user sessions and respective second subsets of the AI responses that are generated in response to the respective second subsets of the AI prompts. The method further comprises generating (FIG. 3, 308) user-prompt feature vectors in user-prompt profiles (FIG. 5, 560) for the users by embedding respective third subsets of the AI prompts that are received among the AI models from the users. The method further comprises triggering (FIG. 3, 310) execution of an instruction, which causes a security action (FIG. 5, 568) to be performed with regard to an incoming AI prompt (FIG. 5, 542), as a result of a difference between an embedding that represents the incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to a difference threshold (FIG. 5, 570).

(E2) In the example method of E1, wherein at least the subset of the user-session feature vectors comprises a single user-session feature vector from the user-session feature vectors; and wherein at least the subset of the user-prompt feature vectors comprises a single user-prompt feature vector from the user-prompt feature vectors.

(E3) In the example method of any of E1-E2, wherein at least the subset of the user-session feature vectors comprises an aggregation of the user-session feature vectors; and wherein at least the subset of the user-prompt feature vectors comprises an aggregation of the user-prompt feature vectors.

(E4) In the example method of any of E1-E3, wherein the model-session feature vector represents a normal distribution of the model sessions represented by the model-session profile; wherein the model-response feature vector represents a normal distribution of the AI responses represented by the model-response profile; wherein the user-session feature vectors represent normal distributions of respective subsets of the user sessions; and wherein the user-prompt feature vectors represent normal distributions of the respective third subsets of the AI prompts that are received among the AI models from the users.

(E5) In the example method of any of E1-E4, further comprising: generating user-response feature vectors in user-response profiles for the users by embedding respective fourth subsets of the AI prompts that are received among the AI models from the users; wherein triggering the execution of the instruction causes the security action to be performed with regard to the incoming AI prompt further as a result of a difference between the embedding that represents the incoming AI prompt and a third identified feature vector that represents at least a subset of the user-response feature vectors being greater than or equal to a second difference threshold.

(E6) In the example method of any of E1-E5, wherein the model-session feature vector is an embedding of an aggregation of the model sessions of the AI models.

(E7) In the example method of any of E1-E6, wherein the model-response feature vector is an embedding of an aggregation of the AI responses that are generated by the AI models.

(E8) In the example method of any of E1-E7, wherein the first identified feature vector represents a single user-session feature vector in the user-session feature vectors; and wherein the second identified feature vector represents a single user-prompt feature vector in the user-prompt feature vectors.

(E9) In the example method of any of E1-E8, wherein the first identified feature vector represents an aggregation of the user-session feature vectors; and wherein the second identified feature vector represents an aggregation of the user-prompt feature vectors.

(E10) In the example method of any of E1-E9, wherein the model-session feature vector, the model-response feature vector, the user-session feature vectors, and the user-prompt feature vectors are generated using a cross-lingual language model.

(F1) A third example method is implemented by a computing system (FIG. 1, 102A-102M, 106A-106N; FIG. 5, 500; FIG. 6, 602; FIG. 7, 700). The method comprises generating (FIG. 4A, 402) a model-session profile (FIG. 5, 552) that represents semantic meanings of model sessions of artificial intelligence (AI) models (FIG. 5, 526). A model session comprises a first subset of AI prompts received by an AI model during the model session and a first subset of AI responses generated by the AI model in response to the first subset of the AI prompts. The method further comprises generating (FIG. 4A, 404) a model-response profile (FIG. 5, 554) that represents semantic meanings of a plurality of AI responses (FIG. 5, 540) that are generated by the AI models in response to a plurality of AI prompts (FIG. 5, 538). The method further comprises generating (FIG. 4A, 406) a model-prompt profile (FIG. 5, 556) that represents semantic meanings of the plurality of AI prompts. The method further comprises generating (FIG. 4A, 408) user-session profiles (FIG. 5, 558) that represent semantic meanings of user sessions of users with regard to the AI models. A user session comprises a second subset of the plurality of AI prompts that is received from a user at an AI model during the user session and a second subset of the plurality of AI responses that is generated by the AI model in response to the second subset of the plurality of AI prompts. The method further comprises generating (FIG. 4B, 410) user-prompt profiles (FIG. 5, 560) for the users. A user-prompt profile represents semantic meanings of respective AI prompts in a third subset of the plurality of AI prompts that is received among the AI models from a user. The method further comprises generating (FIG. 4B, 412) user-response profiles (FIG. 5, 562) for the users. A user-response profile represents semantic meanings of respective AI responses in a third subset of the plurality of AI responses that is generated by an AI model in response to a subset of the plurality of AI prompts that is received from a user at the AI model. The method further comprises triggering (FIG. 4B, 414) execution of an instruction, which causes a security action (FIG. 5, 568) to be performed with regard to an incoming AI prompt (FIG. 5, 542), as a result of a difference between the incoming AI prompt and the model-session profile, the model-response profile, the model-prompt profile, at least a subset of the user-session profiles, at least a subset of the user-prompt profiles, or at least a subset of the user-response profiles being greater than or equal to a difference threshold (FIG. 5, 570).

(F2) In the example method of F1, wherein at least the subset of the user-response profiles comprises a single user-prompt profile from the user-prompt profiles.

(F3) In the example method of any of F1-F2, wherein at least the subset of the user-response profiles comprises an aggregation of the user-prompt profiles.

(F4) In the example method of any of F1-F3, wherein at least the subset of the user-session profiles comprises a single user-session profile from the user-session profiles.

(F5) In the example method of any of F1-F4, wherein at least the subset of the user-session profiles comprises an aggregation of the user-session profiles.

(F6) In the example method of any of F1-F5, wherein at least the subset of the user-prompt profiles comprises a single user-prompt profile from the user-prompt profiles.

(F7) In the example method of any of F1-F6, wherein at least the subset of the user-prompt profiles comprises an aggregation of the user-prompt profiles.

(F8) In the example method of any of F1-F7, further comprising: generating a normal distribution of the model sessions represented by the model-session profile, a normal distribution of the plurality of AI responses represented by the model-response profile, a normal distribution of the plurality of AI prompts represented by the model-prompt profile, a normal distribution of the user sessions represented by at least the subset of the user-session profiles, a normal distribution of the AI prompts represented by at least the subset of the user-prompt profiles, and a normal distribution of the AI responses represented by at least the subset of the user-response profiles; wherein triggering the execution of the instruction causes the security action to be performed with regard to the incoming AI prompt as a result of a difference between the incoming AI prompt and the normal distribution of the model sessions represented by the model-session profile, the normal distribution of the plurality of AI responses represented by the model-response profile, the normal distribution of the plurality of AI prompts represented by the model-prompt profile, the normal distribution of the user sessions represented by at least the subset of the user-session profiles, the normal distribution of the AI prompts represented by at least the subset of the user-prompt profiles, or the normal distribution of the AI responses represented by at least the subset of the user-response profiles being greater than or equal to the difference threshold.

(F9) In the example method of any of F1-F8, wherein generating the model-session profile comprises: generating a model-session feature vector by embedding at least a subset of the model sessions; wherein generating the model-response profile comprises: generating a model-response feature vector by embedding at least a subset of the plurality of AI responses; wherein generating the model-prompt profile comprises: generating a model-prompt feature vector by embedding at least a subset of the plurality of AI prompts; wherein generating the user-session profiles comprises: generating user-session feature vectors by embedding respective second subsets of the plurality of AI prompts that are received among the AI models from the users during the user sessions and respective second subsets of the plurality of AI responses that are generated in response to the respective second subsets of the plurality of AI prompts; wherein generating the user-prompt profiles comprises: generating user-prompt feature vectors by embedding respective third subsets of the plurality of AI prompts that are received among the AI models from the users; wherein generating the user-response profiles comprises: generating user-response feature vectors by embedding respective third subsets of the plurality of AI responses that are provided to the users; and wherein triggering the execution of the instruction causes the security action to be performed with regard to the incoming AI prompt as a result of a difference between an embedding that represents the incoming AI prompt and the model-session feature vector, the model-response feature vector, the model-prompt feature vector, a first identified feature vector that represents at least a subset of the user-session feature vectors, a second identified feature vector that represents at least a subset of the user-prompt feature vectors, or a third identified feature vector that represents at least a subset of the user-response feature vectors being greater than or equal to the difference threshold.

(F10) In the example method of any of F1-F9, wherein the model-session feature vector is an embedding of an aggregation of the model sessions of the AI models.

(F11) In the example method of any of F1-F10, wherein the model-response feature vector is an embedding of an aggregation of the AI responses that are generated by the AI models.

(F12) In the example method of any of F1-F11, wherein the first identified feature vector represents a single user-session feature vector in the user-session feature vectors.

(F13) In the example method of any of F1-F12, wherein the first identified feature vector represents an aggregation of the user-session feature vectors.

(F14) In the example method of any of F1-F13, wherein the second identified feature vector represents a single user-prompt feature vector in the user-prompt feature vectors.

(F15) In the example method of any of F1-F14, wherein the second identified feature vector represents an aggregation of the user-prompt feature vectors.

(F16) In the example method of any of F1-F15, wherein the third identified feature vector represents a single user-response feature vector in the user-response feature vectors.

(F17) In the example method of any of F1-F16, wherein the third identified feature vector represents an aggregation of the user-response feature vectors.

(F18) In the example method of any of F1-F17, wherein the model-session feature vector, the model-response feature vector, the model-prompt feature vector, the user-session feature vectors, the user-prompt feature vectors, and the user-response feature vectors are generated using a cross-lingual language model.

(G1) A first example computer program product (FIG. 6, 624; FIG. 7, 718, 722) comprises a computer-readable storage medium having instructions recorded thereon for enabling a processor-based system (FIG. 1, 102A-102M, 106A-106N; FIG. 5, 500; FIG. 6, 602; FIG. 7, 700) to perform operations. The operations comprise generating (FIG. 2, 202) a model-session profile (FIG. 5, 552) that represents semantic meanings of model sessions of an artificial intelligence (AI) model (FIG. 5, 526). A model session comprises a first subset of AI prompts (FIG. 5, 538) that is received by the AI model during the model session and a first subset of AI responses (FIG. 5, 540) that is generated by the AI model in response to the first subset of the AI prompts. The operations further comprise generating (FIG. 2, 204) a model-response profile (FIG. 5, 554) that represents semantic meanings of the AI responses. The operations further comprise generating (FIG. 2, 206) user-session profiles (FIG. 5, 558) that represent semantic meanings of user sessions of users with regard to the AI model. A user session comprises a second subset of the AI prompts that is received from a user at the AI model during the user session and a second subset of the AI responses that is generated by the AI model in response to the second subset of the AI prompts. The operations further comprise generating (FIG. 2, 208) user-prompt profiles (FIG. 5, 560) for the users. A user-prompt profile represents a semantic meaning of a third subset of the AI prompts that is received from a user at the AI model. The operations further comprise triggering (FIG. 2, 210) execution of an instruction, which causes a security action (FIG. 5, 568) to be performed with regard to an incoming AI prompt (FIG. 5, 542), as a result of a difference between the incoming AI prompt and the model-session profile, the model-response profile, at least a subset of the user-session profiles, or at least a subset of the user-prompt profiles being greater than or equal to a difference threshold (FIG. 5, 570).

(H1) A second example computer program product (FIG. 6, 624; FIG. 7, 718, 722) comprises a computer-readable storage medium having instructions recorded thereon for enabling a processor-based system (FIG. 1, 102A-102M, 106A-106N; FIG. 5, 500; FIG. 6, 602; FIG. 7, 700) to perform operations. The operations comprise generating (FIG. 3, 302) a model-session feature vector in a model-session profile (FIG. 5, 552), which represents semantic meanings of model sessions of artificial intelligence (AI) models (FIG. 5, 526), by embedding at least a subset of the model sessions. A model session comprises a first subset of AI prompts (FIG. 5, 538) that is received by an AI model during the model session and a first subset of AI responses (FIG. 5, 540) that is generated by the AI model in response to the first subset of the AI prompts. The operations further comprise generating (FIG. 3, 304) a model-response feature vector in a model-response profile (FIG. 5, 554), which represents semantic meanings of the AI responses that are generated by the AI models, by embedding at least a subset of the AI responses. The operations further comprise generating (FIG. 3, 306) user-session feature vectors in user-session profiles (FIG. 5, 558), which represent semantic meanings of user sessions of users with regard to the AI models, by embedding the user sessions, which comprise respective second subsets of the AI prompts that are received among the AI models from the users during the user sessions and respective second subsets of the AI responses that are generated in response to the respective second subsets of the AI prompts. The operations further comprise generating (FIG. 3, 308) user-prompt feature vectors in user-prompt profiles (FIG. 5, 560) for the users by embedding respective third subsets of the AI prompts that are received among the AI models from the users. The operations further comprise triggering (FIG. 3, 310) execution of an instruction, which causes a security action (FIG. 5, 568) to be performed with regard to an incoming AI prompt (FIG. 5, 542), as a result of a difference between an embedding that represents the incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to a difference threshold (FIG. 5, 570).

(I1) A third example computer program product (FIG. 6, 624; FIG. 7, 718, 722) comprises a computer-readable storage medium having instructions recorded thereon for enabling a processor-based system (FIG. 1, 102A-102M, 106A-106N; FIG. 5, 500; FIG. 6, 602; FIG. 7, 700) to perform operations. The operations comprise generating (FIG. 4A, 402) a model-session profile (FIG. 5, 552) that represents semantic meanings of model sessions of artificial intelligence (AI) models (FIG. 5, 526). A model session comprises a first subset of AI prompts received by an AI model during the model session and a first subset of AI responses generated by the AI model in response to the first subset of the AI prompts. The operations further comprise generating (FIG. 4A, 404) a model-response profile (FIG. 5, 554) that represents semantic meanings of a plurality of AI responses (FIG. 5, 540) that are generated by the AI models in response to a plurality of AI prompts (FIG. 5, 538). The operations further comprise generating (FIG. 4A, 406) a model-prompt profile (FIG. 5, 556) that represents semantic meanings of the plurality of AI prompts. The operations further comprise generating (FIG. 4A, 408) user-session profiles (FIG. 5, 558) that represent semantic meanings of user sessions of users with regard to the AI models. A user session comprises a second subset of the plurality of AI prompts that is received from a user at an AI model during the user session and a second subset of the plurality of AI responses that is generated by the AI model in response to the second subset of the plurality of AI prompts. The operations further comprise generating (FIG. 4B, 410) user-prompt profiles (FIG. 5, 560) for the users. A user-prompt profile represents semantic meanings of respective AI prompts in a third subset of the plurality of AI prompts that is received among the AI models from a user. The operations further comprise generating (FIG. 4B, 412) user-response profiles (FIG. 5, 562) for the users. A user-response profile represents semantic meanings of respective AI responses in a third subset of the plurality of AI responses that is generated by an AI model in response to a subset of the plurality of AI prompts that is received from a user at the AI model. The operations further comprise triggering (FIG. 4B, 414) execution of an instruction, which causes a security action (FIG. 5, 568) to be performed with regard to an incoming AI prompt (FIG. 5, 542), as a result of a difference between the incoming AI prompt and the model-session profile, the model-response profile, the model-prompt profile, at least a subset of the user-session profiles, at least a subset of the user-prompt profiles, or at least a subset of the user-response profiles being greater than or equal to a difference threshold (FIG. 5, 570).

III. Example Computer System

FIG. 7 depicts an example computer 700 in which embodiments may be implemented. Any one or more of the user devices 102A-102M and/or any one or more of the servers 106A-106N shown in FIG. 1 and/or the computing system 500 shown in FIG. 5 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processor system 702, a system memory 704, and a bus 706 that couples various system components including system memory 704 to processor system 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) the profile-based anomaly detection logic 108, the profile-based anomaly detection logic 508, the model-session profile logic 512, the model-response profile logic 514, the model-prompt profile logic 516, the user-session profile logic 518, the user-prompt profile logic 520, the user-response profile logic 522, the security action logic 524, the AI model(s) 526, the session defining logic 528, the normal distribution logic 530, the anomaly score logic 532, the trigger logic 534, flowchart 200 (including any step of flowchart 200), flowchart 300 (including any step of flowchart 300), and/or flowchart 400 (including any step of flowchart 400), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processor system 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a processor system; and
a memory that stores computer-executable instructions that are executable by the processor system to at least:
generate a model-session profile that represents semantic meanings of model sessions of an artificial intelligence (AI) model, a model session comprising a first subset of AI prompts received by the AI model during the model session and a first subset of AI responses generated by the AI model in response to the first subset of the AI prompts;
generate a model-response profile that represents semantic meanings of the AI responses;
generate user-session profiles that represent semantic meanings of user sessions of users with regard to the AI model, a user session comprising a second subset of the AI prompts that is received from a user at the AI model during the user session and a second subset of the AI responses that is generated by the AI model in response to the second subset of the AI prompts;
generate user-prompt profiles for the users, a user-prompt profile representing a semantic meaning of a third subset of the AI prompts that is received from a user at the AI model;
assign anomaly scores to an incoming AI prompt, the anomaly scores representing differences between the incoming AI prompt and the model-session profile, the model-response profile, at least a subset of the user-session profiles, and at least a subset of the user-prompt profiles; and
trigger execution of an instruction, which causes a security action to be performed with regard to the incoming AI prompt, as a result of an anomaly score, which is comprised in the anomaly scores, being greater than or equal to an anomaly score threshold.

2. The system of claim 1, wherein the anomaly scores correspond to the differences between the incoming AI prompt and a normal distribution of the model sessions represented by the model-session profile, a normal distribution of the AI responses represented by the model-response profile, a normal distribution of the user sessions represented by at least the subset of the user-session profiles, and a normal distribution of subsets of the AI prompts represented by at least the subset of the user-prompt profiles.

3. The system of claim 2, wherein the computer-executable instructions are executable by the processor system further to at least:
generate the normal distribution of the model sessions represented by the model-session profile, the normal distribution of the AI responses represented by the model-response profile, the normal distribution of the user sessions represented by at least the subset of the user-session profiles, and the normal distribution of subsets of the AI prompts represented by at least the subset of the user-prompt profiles using a one-class classifier.

4. The system of claim 1, wherein the computer-executable instructions are executable by the processor system to at least:
classify the incoming AI prompt as an anomalous AI prompt as the result of the anomaly score, which is comprised in the anomaly scores, being greater than or equal to the anomaly score threshold; and
trigger the execution of the instruction, which causes the security action to be performed with regard to the incoming AI prompt, as a result of the incoming AI prompt being classified as the anomalous AI prompt.

5. The system of claim 1, wherein the computer-executable instructions are executable by the processor system to at least:
generate user-response profiles for the users, a user-response profile representing a semantic meaning of a third subset of the AI responses that is generated by the AI model in response to a subset of the AI prompts that is received from a user at the AI model; and
trigger the execution of the instruction causes the security action to be performed with regard to the incoming AI prompt further as a result of a difference between the incoming AI prompt and a user-response profile in the user-response profiles being greater than or equal to a second difference threshold.

6. The system of claim 1, wherein the computer-executable instructions are executable by the processor system to at least:
generate a model-session feature vector, which is comprised in the model-session profile, by embedding at least a subset of the model sessions;
generate a model-response feature vector, which is comprised in the model-response profile, by embedding at least a subset of the AI responses;
generate user-session feature vectors, which are comprised in the user-session profiles, by embedding respective second subsets of the AI prompts that are received from the users at the AI model during the user sessions and respective second subsets of the AI responses that are generated by the AI model in response to the respective second subsets of the AI prompts;
generate user-prompt feature vectors, which are comprised in the user-prompt profiles, by embedding respective third subsets of the AI prompts that are received from the users at the AI model; and
trigger the execution of the instruction, which causes the security action to be performed with regard to the incoming AI prompt, as a result of a difference between an embedding that represents the incoming AI prompt and the model-session feature vector, the model-response feature vector, a first identified feature vector that represents at least a subset of the user-session feature vectors, or a second identified feature vector that represents at least a subset of the user-prompt feature vectors being greater than or equal to the difference threshold.

7. The system of claim 6, wherein the model-session feature vector is an embedding of a single model session from the model sessions; and wherein the model-response feature vector is an embedding of a single AI response from the AI responses.

8. The system of claim 6, wherein the model-session feature vector is an embedding of an aggregation of the model sessions; and wherein the model-response feature vector is an embedding of an aggregation of the AI responses.

9. The system of claim 6, wherein the first identified feature vector represents a single user-session feature vector in the user-session feature vectors; and wherein the second identified feature vector represents a single user-prompt feature vector in the user-prompt feature vectors.

10. The system of claim 6, wherein the first identified feature vector represents an aggregation of the user-session feature vectors; and wherein the second identified feature vector represents an aggregation of the user-prompt feature vectors.

11. The system of claim 6, wherein the computer-executable instructions are executable by the processor system to at least:

generate the model-session feature vector, the model-response feature vector, the user-session feature vectors, and the user-prompt feature vectors using a cross-lingual language model.

12. A method implemented by a computing system, the method comprising:

generating a model-session feature vector in a model-session profile, which represents semantic meanings of model sessions of artificial intelligence (AI) models, by embedding at least a subset of the model sessions, a model session comprising a first subset of AI prompts that is received by an AI model during the model session and a first subset of AI responses that is generated by the AI model in response to the first subset of the AI prompts;

generating a model-response feature vector in a model-response profile, which represents semantic meanings of the AI responses that are generated by the AI models, by embedding at least a subset of the AI responses;

generating user-session feature vectors in user-session profiles, which represent semantic meanings of user sessions of users with regard to the AI models, by embedding the user sessions, which comprise respective second subsets of the AI prompts that are received among the AI models from the users during the user sessions and respective second subsets of the AI responses that are generated in response to the respective second subsets of the AI prompts;

generating user-prompt feature vectors in user-prompt profiles for the users by embedding respective third subsets of the AI prompts that are received among the AI models from the users;

assigning anomaly scores to an incoming AI prompt, the anomaly scores representing differences between an embedding that represents the incoming AI prompt and the model-session feature vector, the model-response feature vector, a first identified feature vector that represents at least a subset of the user-session feature vectors, and a second identified feature vector that represents at least a subset of the user-prompt feature vectors; and triggering execution of an instruction, which causes a security action to be performed with regard to the incoming AI prompt, as a result of an anomaly score, which is comprised in the anomaly scores, being greater than or equal to an anomaly score threshold.

13. The method of claim 12, wherein at least the subset of the user-session feature vectors comprises a single user-session feature vector from the user-session feature vectors; and wherein at least the subset of the user-prompt feature vectors comprises a single user-prompt feature vector from the user-prompt feature vectors.

14. The method of claim 2, wherein at least the subset of the user-session feature vectors comprises an aggregation of the user-session feature vectors; and wherein at least the subset of the user-prompt feature vectors comprises an aggregation of the user-prompt feature vectors.

15. The method of claim 12, wherein the model-session feature vector represents a normal distribution of the model sessions represented by the model-session profile;

wherein the model-response feature vector represents a normal distribution of the AI responses represented by the model-response profile;

wherein the user-session feature vectors represent normal distributions of respective subsets of the user sessions; and wherein the user-prompt feature vectors represent normal distributions of the respective third subsets of the AI prompts that are received among the AI models from the users.

16. The method of claim 12, further comprising:

generating user-response feature vectors in user-response profiles for the users by embedding respective fourth subsets of the AI prompts that are received among the AI models from the users; and assigning an identified anomaly score to the incoming AI prompt, the identified anomaly score representing a difference between the embedding that represents the incoming AI prompt and a third identified feature vector that represents at least a subset of the user-response feature vectors;

wherein triggering the execution of the instruction causes the security action to be performed with regard to the incoming AI prompt further as a result of the identified anomaly score being greater than or equal to a second anomaly score threshold.

17. The method of claim 12, wherein the model-session feature vector is an embedding of an aggregation of the model sessions of the AI models.

18. The method of claim 12, wherein the model-response feature vector is an embedding of an aggregation of the AI responses that are generated by the AI models.

19. The method of claim 12, wherein the model-session feature vector, the model-response feature vector, the user-session feature vectors, and the user-prompt feature vectors are generated using a cross-lingual language model.

20. A computer program product comprising a computer-readable storage medium having instructions recorded thereon for enabling a processor-based system to perform operations, the operations comprising:

generating a model-session profile that represents semantic meanings of model sessions of artificial intelligence (AI) models, a model session comprising a first subset of AI prompts received by an AI model during the model session and a first subset of AI responses generated by the AI model in response to the first subset of the AI prompts;

generating a model-response profile that represents semantic meanings of a plurality of AI responses that are generated by the AI models in response to a plurality of AI prompts;

generating a model-prompt profile that represents semantic meanings of the plurality of AI prompts;

generating user-session profiles that represent semantic meanings of user sessions of users with regard to the AI models, a user session comprising a second subset of the plurality of AI prompts that is received from a user at an AI model during the user session and a second subset of the plurality of AI responses that is generated by the AI model in response to the second subset of the plurality of AI prompts;

generating user-prompt profiles for the users, a user-prompt profile representing semantic meanings of respective AI prompts in a third subset of the plurality of AI prompts that is received among the AI models from a user;

generating user-response profiles for the users, a user-response profile representing semantic meanings of respective AI responses in a third subset of the plurality of AI responses that is generated by an AI model in response to a subset of the plurality of AI prompts that is received from a user at the AI model;

assigning anomaly scores to an incoming AI prompt, the anomaly scores representing differences between the incoming AI prompt and the model-session profile, the model-response profile, the model-prompt profile, at least a subset of the user-session profiles, at least a subset of the user-prompt profiles, and at least a subset of the user-response profiles; and triggering execution of an instruction, which causes a security action to be performed with regard to an incoming AI prompt, as a result of an anomaly score, which is comprised in the anomaly scores, being greater than or equal to an anomaly score threshold.

21. The computer program product of claim 20, wherein the anomaly scores represent differences between the incoming AI prompt and a normal distribution of the model sessions represented by the model-session profile, a normal distribution of the plurality of AI responses represented by the model-response profile, a normal distribution of the plurality of AI prompts represented by the model-prompt profile, a normal distribution of the user sessions represented by at least the subset of the user-session profiles, a normal distribution of third subsets of the plurality of AI prompts represented by at least the subset of the user-prompt profiles, and a normal distribution of third subsets of the plurality of AI responses represented by at least the subset of the user-response profiles.

* * * * *